US012763678B2

(12) United States Patent
Halberstadt

(10) Patent No.: US 12,763,678 B2
(45) Date of Patent: Oct. 13, 2026

(54) CONTROLLER FOR A RESONANT CONVERTER AND A METHOD OF OPERATING A RESONANT CONVERTER

(71) Applicant: NXP USA, Inc., Austin, TX (US)

(72) Inventor: Hans Halberstadt, Groesbeek (NL)

(73) Assignee: NXP USA, Inc., Austin, TX (US)

(*) Notice: Subject to any disclaimer, the term of this patent is extended or adjusted under 35 U.S.C. 154(b) by 39 days.

(21) Appl. No.: 18/956,211

(22) Filed: Nov. 22, 2024

(65) Prior Publication Data

US 2025/0167695 A1 May 22, 2025

(30) Foreign Application Priority Data

Nov. 22, 2023 (EP) .................................... 23211436

(51) Int. Cl.
*H02M 3/00* (2006.01)
*H02M 1/00* (2006.01)
(Continued)

(52) U.S. Cl.
CPC ........... *H02M 3/01* (2021.05); *H02M 1/0003* (2021.05); *H02M 1/0025* (2021.05);
(Continued)

(58) Field of Classification Search
CPC ............. H02M 7/4818; H02M 1/0003; H02M 1/0025; H02M 1/4241; H02M 3/01;
(Continued)

(56) References Cited

U.S. PATENT DOCUMENTS 9,837,907 B1 * 12/2017 Babazadeh ........... H02M 3/158
10,008,943 B2 * 6/2018 Babazadeh ............. H02M 1/44
(Continued)

FOREIGN PATENT DOCUMENTS

CN 114583932 A 6/2022
JP 2021072722 A 5/2021
(Continued)

OTHER PUBLICATIONS

Chen, Huan et al.; "A Comprehensive Analysis of Gate Drive Delay in CLLC Converters and Its Compensation Method"; 2019 IEEE Energy Conversion Congress and Exposition; Sep. 2019; 8 pages.
(Continued)

*Primary Examiner* — Yusef A Ahmed

(57) ABSTRACT

A controller for a resonant converter. If a measured current signal is greater than an upper-low-load-current-threshold, then the controller sets an upper-voltage-threshold-value based on the measured current signal. If the measured current signal is not greater than the upper-low-load-current-threshold, then the controller sets the upper-voltage-threshold-value based on the power setting signal but independent of the measured current signal. If the measured current signal is less than a lower-low-load-current-threshold, then the controller sets a lower-voltage-threshold-value based on the measured current signal. If the measured current signal is not less than the lower-low-load-current-threshold, then the controller sets the lower-voltage-threshold-value based on the power setting signal but independent of the measured current signal. In response to a measured voltage signal exceeding the upper-voltage-threshold-value, the controller opens the first switch and closes the second switch. In response to the measured voltage signal dropping below a lower-voltage-threshold-value, the controller opens the second switch and closes the first switch.

13 Claims, 32 Drawing Sheets

(51) Int. Cl.
*H02M 1/42* (2007.01)
*H02M 3/335* (2006.01)
*H02M 7/48* (2007.01)

(52) U.S. Cl.
CPC ..... *H02M 1/4241* (2013.01); *H02M 3/33571* (2021.05); *H02M 3/33576* (2013.01); *H02M 3/33592* (2013.01); *H02M 7/4818* (2021.05)

(58) Field of Classification Search
CPC ......... H02M 3/33571; H02M 3/33576; H02M 3/33592; Y02B 70/10
See application file for complete search history.

(56) References Cited

U.S. PATENT DOCUMENTS

| | | | | |
|---|---|---|---|---|
| 10,186,975 | B2 * | 1/2019 | Ouyang | H02M 1/08 |
| 11,581,804 | B1 * | 2/2023 | Langeslag | H02M 3/33569 |
| 2007/0018618 | A1 | 1/2007 | Endo | |
| 2010/0033998 | A1 * | 2/2010 | Halberstadt | H02M 3/3376 363/97 |
| 2011/0242856 | A1 * | 10/2011 | Halberstadt | H02M 3/3376 363/21.02 |
| 2012/0127761 | A1 * | 5/2012 | Halberstadt | H02M 3/01 363/21.02 |
| 2012/0327692 | A1 * | 12/2012 | Cantoro | H02M 3/3376 363/21.02 |
| 2013/0099590 | A1 * | 4/2013 | Ma | H02M 3/3388 307/104 |
| 2013/0099787 | A1 * | 4/2013 | Lu | H02M 3/3376 324/319 |
| 2013/0099788 | A1 * | 4/2013 | Xu | H02M 3/3376 324/322 |
| 2013/0229829 | A1 * | 9/2013 | Zhang | H02M 3/01 363/16 |
| 2013/0308347 | A1 * | 11/2013 | Sato | H02M 3/33507 363/21.03 |
| 2014/0268904 | A1 * | 9/2014 | Reddy | H02M 3/33571 363/21.02 |
| 2015/0194896 | A1 * | 7/2015 | Stuler | H02M 3/33523 363/21.02 |
| 2016/0268913 | A1 * | 9/2016 | Halberstadt | H02M 3/3376 |
| 2017/0093296 | A1 * | 3/2017 | Chen | H02M 1/088 |
| 2017/0110973 | A1 * | 4/2017 | Chen | H03L 7/00 |
| 2017/0331386 | A1 * | 11/2017 | Babazadeh | H02M 3/3376 |
| 2018/0166903 | A1 | 6/2018 | Sato et al. | |
| 2018/0191252 | A1 * | 7/2018 | Bianco | H02M 3/01 |
| 2018/0301990 | A1 * | 10/2018 | Horwitz | H02M 3/3376 |
| 2018/0342957 | A1 * | 11/2018 | Bianco | H02M 3/33561 |
| 2019/0229628 | A1 * | 7/2019 | Halberstadt | H02M 1/088 |
| 2020/0169176 | A1 * | 5/2020 | Murata | H02M 3/01 |
| 2020/0195151 | A1 * | 6/2020 | Chen | H02M 3/33571 |
| 2020/0195155 | A1 * | 6/2020 | Colbeck | H02M 3/33571 |
| 2020/0412260 | A1 * | 12/2020 | Skinner | H02M 7/523 |
| 2021/0391800 | A1 * | 12/2021 | Jiang | H02M 1/0022 |
| 2022/0166327 | A1 * | 5/2022 | Liu | H02M 1/0025 |
| 2023/0056448 | A1 * | 2/2023 | Langeslag | H02M 3/33569 |
| 2025/0070656 | A1 | 2/2025 | Pervaiz et al. | |
| 2025/0141350 | A1 * | 5/2025 | van Rens | H02M 3/33576 |
| 2025/0141351 | A1 * | 5/2025 | Halberstadt | H02M 1/0009 |
| 2025/0167677 | A1 * | 5/2025 | Twelkemeijer | H02M 3/01 |

FOREIGN PATENT DOCUMENTS

| | | | |
|---|---|---|---|
| WO | WO-2006103609 | A2 | 10/2006 |
| WO | WO-2012094268 | A1 | 7/2012 |

OTHER PUBLICATIONS

Oruganti, Ramesh et al.; "Resonant-Tank Control of Parallel Resonant Converter"; Nov. 1991; 8 pages.

U.S. Appl. No. 18/956,13; Non-Final Office Action mailed Jun. 5, 2026; 18 pages.

* cited by examiner

Switches driven by charge difference between beginning and end of halfcycle $$\text{Ipeakref(Ctrl\_p\_border, Ctrl\_p\_border1, low, med, high, Ctrl\_p, Imagn\_red)} := \left| \begin{array}{l} \text{xx} \leftarrow \begin{pmatrix} 0 \\ \text{Ctrl\_p\_border} \\ \text{Ctrl\_p\_border1} \\ 5 \end{pmatrix} \\ \text{yy} \leftarrow \begin{pmatrix} \text{low} \\ \text{med} \\ \text{high} \\ \text{high} \end{pmatrix} \\ \text{Ipeakref} \leftarrow \text{linterp(xx, yy, Ctrl\_p)} - \text{Imagn\_red} \\ \text{Ipeakref} \end{array} \right.$$

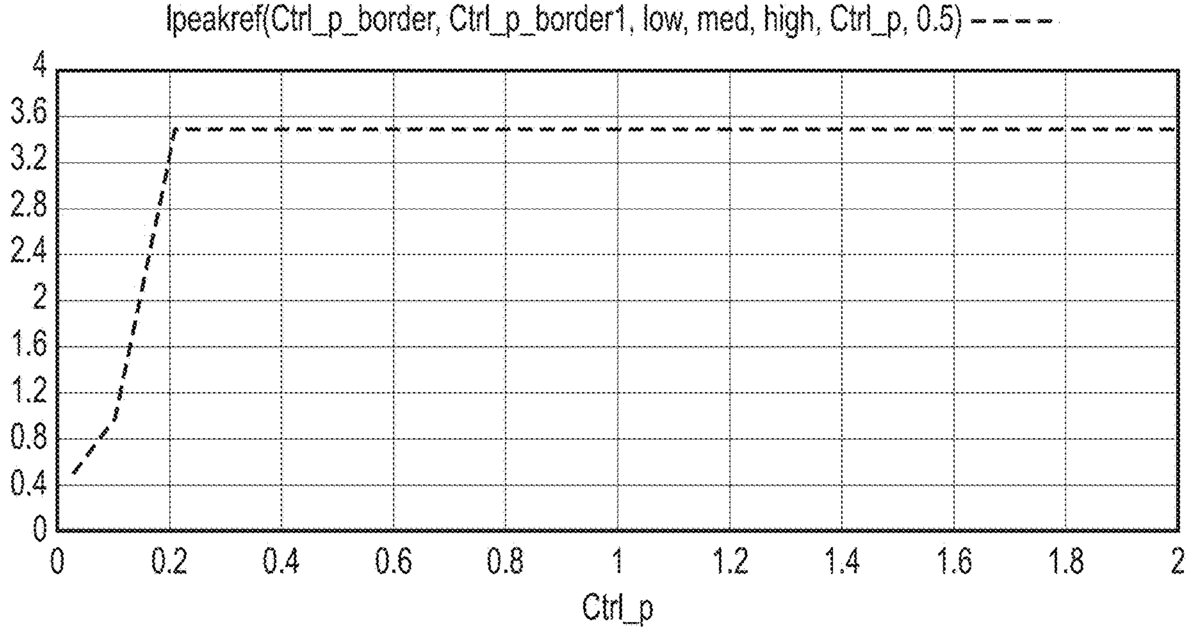

FIG. 32

$$\text{refscale(alpha, Ctrl\_p\_border, Ctrl\_p)} := \left| \begin{array}{l} xx \leftarrow \begin{pmatrix} 0 \\ \text{alpha} \cdot \text{Ctrl\_p\_border} \\ 2 \end{pmatrix} \\ yy \leftarrow \begin{pmatrix} 1 \\ 0 \\ 0 \end{pmatrix} \\ \text{refscale} \leftarrow \text{linterp(xx, yy, Ctrl\_p)} \\ \text{refscale} \end{array} \right.$$

CONTROLLER FOR A RESONANT CONVERTER AND A METHOD OF OPERATING A RESONANT CONVERTER

CROSS-REFERENCE TO RELATED APPLICATIONS

This application claims the priority under 35 U.S.C. § 119 of European Patent application no. 23211436.3, filed on 22 Nov. 2023, the contents of which are incorporated by reference herein.

FIELD

The present disclosure relates to a controller for resonant converter, and a method of operating resonant converters.

SUMMARY

According to a first aspect of the present disclosure there is provided a controller for a resonant converter, wherein the resonant converter is for supplying electrical energy from a supply source to a load, the resonant converter comprising:

a first switch and a second switch connected in series with each other between the supply source and a reference terminal, wherein the resonant converter has a high-side switch half cycle when the first switch is closed and the second switch is open, and wherein the resonant converter has a low-side switch half cycle when the first switch is open and the second switch is closed; and a resonant tank that is electrically connected to the first and second switches, wherein the resonant tank comprises a resonant capacitor; wherein the controller is configured to:

receive a measured current signal that represents the current flowing in the resonant tank;

receive a measured voltage signal that represents the voltage at a predetermined point in the resonant tank;

receive a power setting signal, which defines a requested power level for the load;

if the measured current signal is greater than an upper-low-load-current-threshold, then set an upper-voltage-threshold-value based on the measured current signal;

if the measured current signal is not greater than the upper-low-load-current-threshold, then set the upper-voltage-threshold-value based on the power setting signal but independent of the measured current signal;

if the measured current signal is less than a lower-low-load-current-threshold, then set a lower-voltage-threshold-value based on the measured current signal;

if the measured current signal is not less than the lower-low-load-current-threshold, then set the lower-voltage-threshold-value based on the power setting signal but independent of the measured current signal;

in response to the measured voltage signal exceeding the upper-voltage-threshold-value, open the first switch and close the second switch; and in response to the measured voltage signal dropping below the lower-voltage-threshold-value, open the second switch and close the first switch.

In one or more embodiments, the controller is further configured to:

set the value of the upper-low-load-current-threshold based on the received power setting signal; and set the value of the lower-low-load-current-threshold based on the received power setting signal.

In one or more embodiments, the controller is further configured to, if the received power setting signal is greater than a high-load threshold, then:

set the value of the upper-low-load-current-threshold as a high-load constant value; and set the value of the lower-low-load-current-threshold as a high-load constant value.

In one or more embodiments, the controller is further configured to, if the received power setting signal is less than the high-load threshold, then:

set the value of the upper-low-load-current-threshold as a value that is less than the high-load constant value; and set the value of the lower-low-load-current-threshold as a value that is less than the high-load constant value.

In one or more embodiments, the controller is further configured to, if the received power setting signal is less than the high-load threshold, then:

set the value of the upper-low-load-current-threshold as a function of the received power setting signal; and set the value of the lower-low-load-current-threshold as a function of the received power setting signal.

In one or more embodiments, the controller is configured to:

set the value of the upper-low-load-current-threshold as a zero-load-current-value if the received power setting signal is zero; and set the value of the lower-low-load-current-threshold as a zero-load-current-value if the received power setting signal is zero.

In one or more embodiments, the controller is further configured to, if the received power setting signal is less than the high-load threshold, then:

set the value of the upper-low-load-current-threshold as:
- a first function of the received power setting signal if the received power setting signal is greater than a medium-load threshold; and
- a second function of the received power setting signal if the received power setting signal is less than the medium-load threshold; and set the value of the lower-low-load-current-threshold as:
- the first function of the received power setting signal if the received power setting signal is greater than the medium-load threshold; and
- the second function of the received power setting signal if the received power setting signal is less than the medium-load threshold.

In one or more embodiments, the first function and the second function are linear functions. The first function may be steeper than the second function.

In one or more embodiments, the controller is further configured to, if the power setting signal is less than an offset-current-application-power-threshold:

adjust the measured current signal by adding an offset current signal to the measured current signal, and use the adjusted measured current signal instead of the measured current signal.

In one or more embodiments, the magnitude of the offset current signal increases as the magnitude of the power setting signal reduces.

In one or more embodiments, the magnitude of the offset current signal linearly increases as the magnitude of the power setting signal reduces.

In one or more embodiments, the magnitude of offset current signal has a maximum value when the magnitude of the power setting signal is zero.

There is also disclosed a method of operating a resonant converter, wherein the resonant converter is for supplying electrical energy from a supply source to a load, the resonant converter comprising:

a first switch and a second switch connected in series with each other between the supply source and a reference terminal, wherein the resonant converter has a high-side switch half cycle when the first switch is closed and the second switch is open, and wherein the resonant converter has a low-side switch half cycle when the first switch is open and the second switch is closed; and a resonant tank that is electrically connected to the first and second switches, wherein the resonant tank comprises a resonant capacitor; wherein the method comprises:

receiving a measured current signal that represents the current flowing in the resonant tank;

receiving a measured voltage signal that represents the voltage at a predetermined point in the resonant tank;

receiving a power setting signal, which defines a requested power level for the load;

if the measured current signal is greater than an upper-low-load-current-threshold, then setting an upper-voltage-threshold-value based on the measured current signal;

if the measured current signal is not greater than the upper-low-load-current-threshold, then setting the upper-voltage-threshold-value based on the power setting signal but independent of the measured current signal;

if the measured current signal is less than a lower-low-load-current-threshold, then setting a lower-voltage-threshold-value based on the measured current signal;

if the measured current signal is not less than the lower-low-load-current-threshold, then setting the lower-voltage-threshold-value based on the power setting signal but independent of the measured current signal;

in response to the measured voltage signal exceeding the upper-voltage-threshold-value, opening the first switch and closing the second 5 switch; and in response to the measured voltage signal dropping below the lower-voltage-threshold-value, opening the second switch and closing the first switch.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 32 shows the lookup table structure to generate the Ipeakref signal;

DETAILED DESCRIPTION

A resonant power converter can use a half cycle by half cycle switch off mechanism that involves sensing of the resonant capacitor voltage (Vcap) and comparing Vcap to a power reference level of the closed loop operation. This can be referred to as capacitor voltage control. Instead of directly controlling the switches by forcing a switching frequency, the switching frequency results from the Vcap control mechanism.

Figure 1:
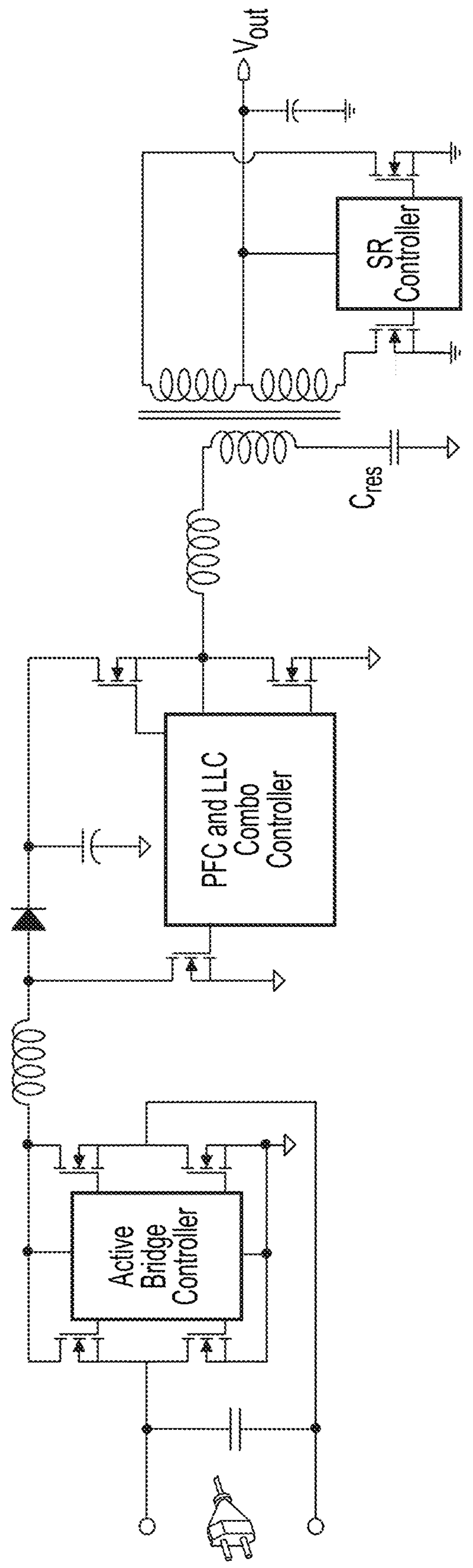
FIG. 1 shows a resonant converter as part of a total power supply.

FIG. 1 shows a resonant converter as part of a total power supply, which is used in an adapter in this example. The adapter includes the following blocks:

- an active bridge controller (mains rectification);
- a PFC controller part (power factor correction using a boost converter architecture);
- a resonant LLC controller part (drives the half bridge stage plus LLC resonant tank including a tapped winding transformer); and
- an SR controller (synchronous rectifier stage to make a rectified output voltage Vout).

The resonant converter can be dimensioned using first harmonic approximation. Furthermore, controlling the output power using a capacitor voltage control method can provide the following advantages:

- Possibility to use dedicated low power modes.
- Much better dynamics because the delivered power almost instantly follows the setpoint for the resonant tank variables. This simplifies the control loop design.

The resonant converter can have a resonant capacitor in series with the half bridge node, and the information for controlling the switches can be derived from the voltage across the resonant capacitor (the side that is not connected to the half bridge node).

This method actually senses the voltage across the transformer, and therefore the DC component of the sensed signal is zero. In some applications, the high voltage signal at the resonant capacitor/transformer node should be attenuated to a low voltage signal that can be processed by an IC (integrated circuit). For this purpose, a capacitive divider can be used because a resistive divider would give an undesired low pass filtering. Due to the fact that the DC component is zero, no information about the DC component is needed so a capacitive divider (not able to transfer a DC component) is sufficient.

As an alternative, the resonant capacitor can also be placed in the ground branch, in series with the primary coil of the transformer, as shown in FIG. 1.

Figure 2:
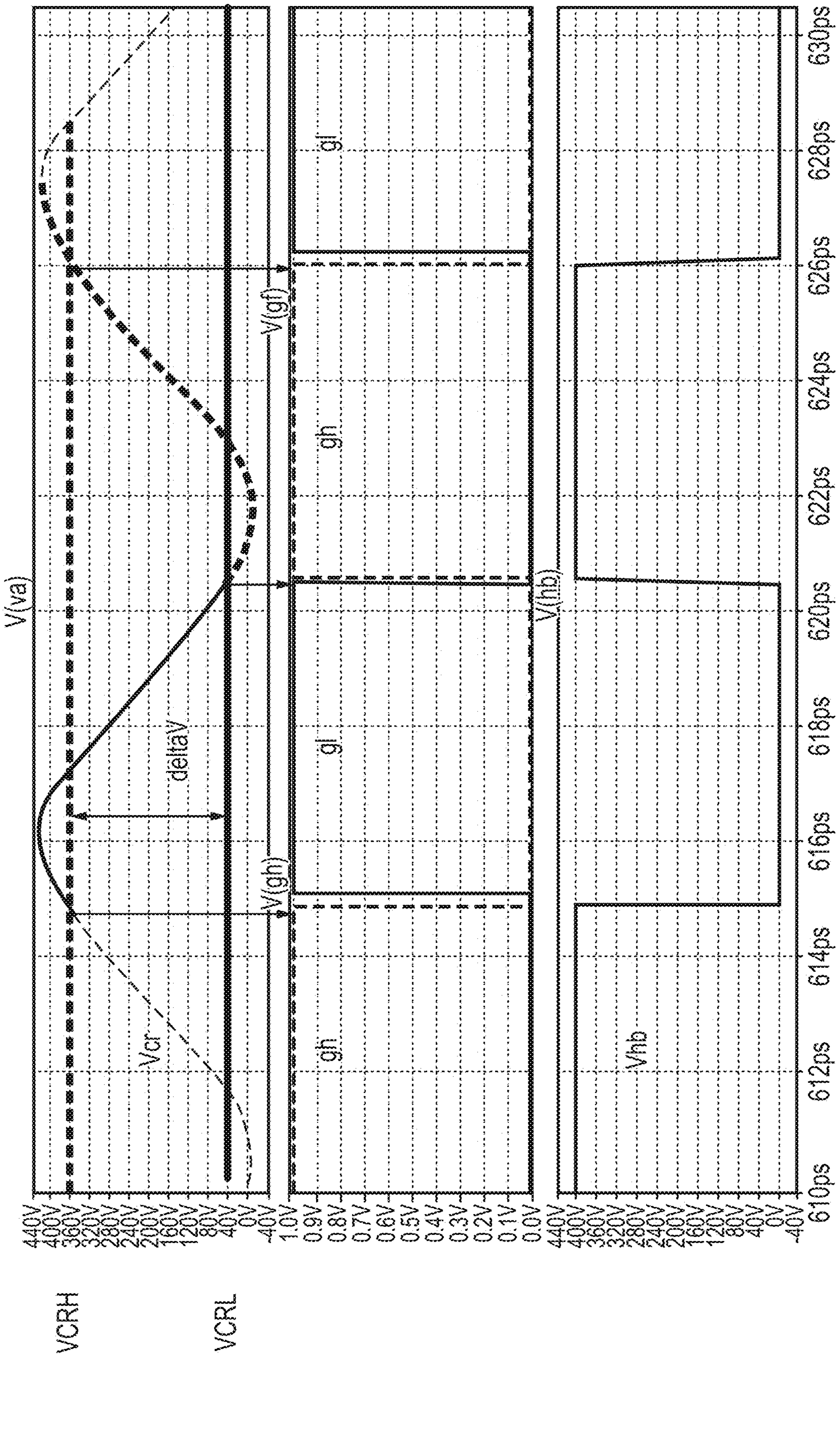
FIG. 2 illustrates the basic principle of capacitor voltage control, with a resonant capacitor at ground side (split-up), for a resonant converter.
Figure 2:
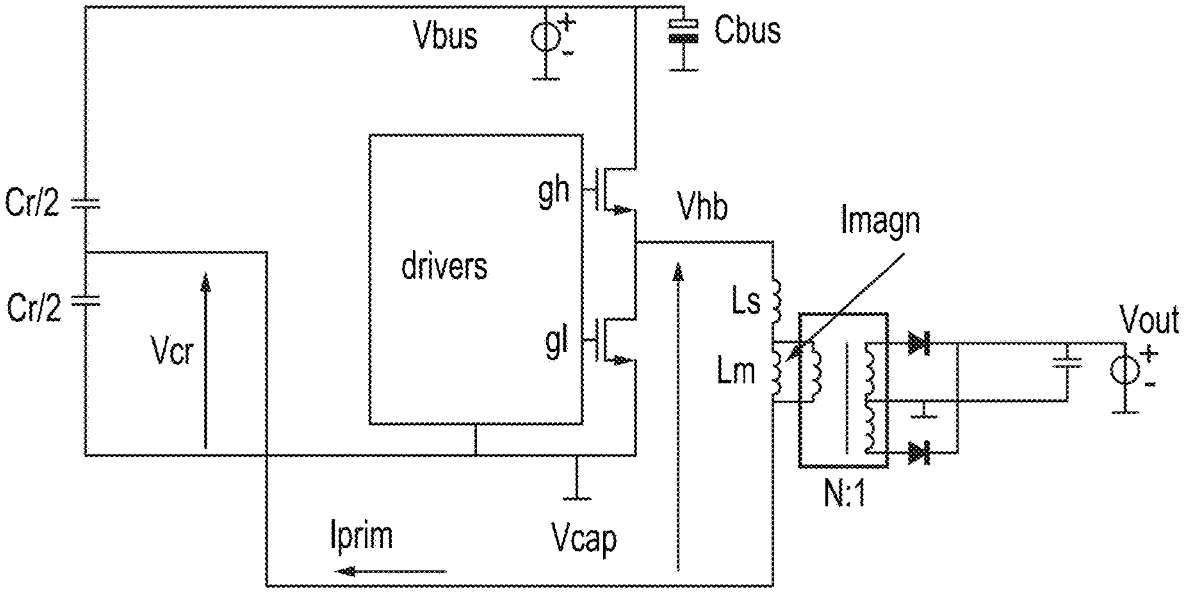

FIG. 2 illustrates the basic principle of capacitor voltage control, with a resonant capacitor at ground side (split-up), for a resonant converter. That is, the resonant capacitor is split between ground and a voltage supply (Vbus) in order to reduce ripple currents in the ground and supply path.

FIG. 2 also shows the timing control principle for the switches with this implementation.

The resonant converter of FIG. 2 includes a controller (not shown), which operates first and second series-arranged, controllable switches. These switches are connected between a supply source (Vbus) and a reference terminal (ground). The controller controls a first, high-side, switch with a signal that is labelled as gh. The controller controls a second, low-side, switch with a signal that is labelled as gl. The voltage at the half-bridge node (the node between the high-side switch and the low-side switch) is labelled as Vhb.

The controller receives a measured voltage signal (Vcr) that represents the voltage at a predetermined point in the resonant tank. In this example, the measured voltage signal (Vcr) represents the voltage across the resonant capacitor. As shown in FIG. 2, the controller compares the measured voltage signal (Vcr) with an upper voltage threshold value (VCRH) and a lower threshold value (VCRL). Based on that comparison, a switch half cycle is ended. More particularly, in response to the measured voltage signal (Vcr) exceeding the upper voltage threshold value (VCRH), the second, low-side, switch is closed and the first, high-side, switch is opened. In response to the measured voltage signal (Vcr) dropping below the lower voltage threshold value (VCRL), the second, low-side, switch is opened and the first, high-side, switch is closed. It will be appreciated that the polarity of the signals can be reversed in an alternative implementation such that: the second, low-side, switch is closed and the first, high-side, switch is opened in response to the measured voltage signal (Vcr) dropping below a lower voltage threshold value; and the second, low-side, switch is opened and the first, high-side, switch is closed in response to the measured voltage signal (Vcr) exceeding an upper voltage threshold value. In this example, a non overlap time is implemented after opening one of the switches before the other one is closed. In this way, there is a slight delay between one half cycle ending and the next half cycle starting. For simplicity, the attenuation of the Vcr voltage for the controller IC is not included in FIG. 2.

For the plots that are shown in FIG. 2, the resonant converter uses an input voltage Vbus of 400V, and therefore Vhb switches between 400V and 0V. For this example:

$$deltaV = 360 - 40 = 320\text{ V};$$

$$VCRH = Vbus/2 + deltaV/2 = 200 + 160 = 360\text{ V; and}$$

$$VCRl = Vbus/2 - deltaV/2 = 200 - 160 = 40\text{ V}.$$

gh and gl have an amplitude of 1V, which is a convenient representation for true=1 and false=0.

The setup of FIG. 2 also takes the DC component of the resonant capacitor into account. The DC component is defined by the input voltage of the half bridge (Vbus) multiplied by the duty cycle of the half bridge voltage (typically Vbus/2 at 50% duty cycle operation).

In practice, a capacitive divider cannot represent the DC component of the resonant capacitor due to leakage and a resistive divider cannot reliably attenuate the high frequency part of the Vcr signal due to parasitic capacitances. With a resistive and capacitive divider in parallel it is difficult to keep the same attenuation ratio due to component tolerances. The DC component across a capacitive divider (with optionally a resistive divider in parallel) can be recovered in a practical circuit by adding a so called symmetry loop.

A symmetry loop compares the measured duty cycle with a desired value of 50% and corrects the capacitive divider DC component such that 50% duty cycle is achieved. The switching together with the divider creates a DC component at the divider. This DC component together with the vcrh and vcrl levels defines a duty cycle and symmetry/asymmetry. A DC symmetry loop senses the duty cycle and regulates the DC value such that a 50% duty cycle occurs with symmetrical half cycles. The symmetry loop can rely on finishing each half cycle by Vcr crossing one of the thresholds (VRCH or VCRL) such that a direct dependency remains with the divided resonant capacitor voltage. This includes the DC level and the difference between the two threshold levels (VRCH or VCRL).

We include below a calculation for the converted power of the resonant converter of FIG. 2 as a function of deltaV, which is the difference between the two threshold levels VCRH and VCRL (these thresholds can also be referred to as vcaph and vcapl).

deltaV across Cr between beginning and end of each half cycle=>Charge difference $$\text{Power} = \text{average current} \times \text{input voltage} = I \times \text{V}bus$$

$$I = Q \times Fswitch$$

$$Q = Cr \times delta\text{V}$$

$$\text{Q} = \text{Cr} \times delta\text{V} \times Fswitch \times \text{V}bus \text{ can be set per switching cycle}$$

It can be seen that the converted energy per switching cycle is directly proportional to deltaV. In theory this means that the converted power can be made 0 when making deltaV=0. Values smaller than 0 are not possible because that would lead to an undefined frequency drifting away to a maximum value, and therefore an infinite amount of solutions possible for the frequency at deltaV=0. Therefore, at least a maximum frequency limit is needed while the converter causes a sudden jump to the maximum frequency when coming close to zero power.

In a practical power converter, the path between: i) the comparators that compare the measured voltage signal, Vcr, to the voltage-threshold-values; and ii) the half bridge node, includes parasitic delays. This means that the effective level of the measured voltage signal, Vcr, at the half bridge switch-over moment is larger than the applied Vcap levels that triggered the switching operation. The result is a shift to a larger converted power than defined by the voltage-threshold-value levels. This especially becomes a problem for high frequency resonant converters, for example operating frequency up to 500 kHz nominal and 1 Mhz maximum at startup at low Vout.

This can also lead to a situation that the power cannot be made 0 while switching, while the jump to maximum frequency already occurs at a few % power and then the power suddenly goes to 0 and frequency goes to Fmax. So, when the load calls for a power level that is lower than this few percentage power, there can be no stable way to achieve this power level. This leads to irregular switching, which is not acceptable.

In some applications, it can be important to keep the converter switching while going to no load. One or more of the examples described herein can address this issue.

Figure 3:
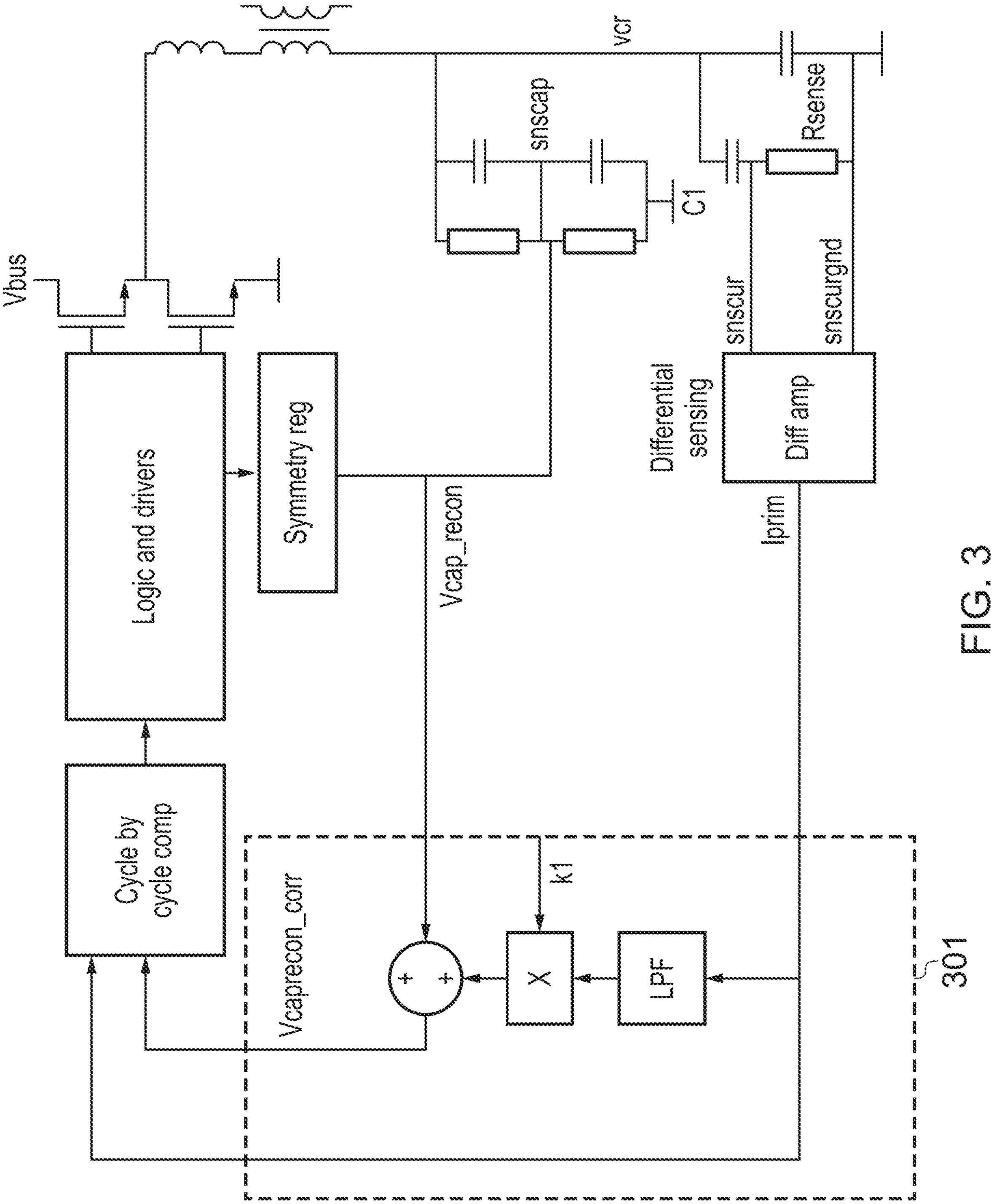
FIG. 3 shows a block diagram of a resonant converter with capacitor voltage control, which has a resonant capacitor at the ground side.

FIG. 3 shows a block diagram of a resonant converter with capacitor voltage control, which has a resonant capacitor at the ground side. The resonant converter also has a symmetry loop, cycle by cycle comparators and delay compensation based on adding a scaled version (k1) of the primary current.

In FIG. 3, the delay compensation is performed by adding a signal proportional to the derivative of Vcr to the original Vcr signal. This is shown within the dashed box that is identified with reference number 301 in FIG. 3. As Vcr is the integral of the resonant current, it means that the derivative of Vcr is related to the resonant current itself. Therefore a scaled portion of the primary current is added to Vcr in order to get a signal that is slightly phase shifted, as if there were a negative delay. This negative delay can then partly compensate the effect of the positive delay. We will not describe this functionality in detail because it is not the focus of the present disclosure.

This solution works for high frequency resonant converters to compensate the effect of delay for powers larger than approximately 5% of the maximum load, thereby addressing the inaccuracy in the relationship between deltaV and power. However it may not be able to prevent complications when going to no load operation.

Another mode of operation is burst mode operation. In this case, the power is concentrated into bursts of larger power followed by intervals where no switching occurs. This works fine, but the burst mode can give audible noise. As a result, the bursts can have soft edges (called soft start and soft stop). This means that a burst is started with zero power and even a larger frequency in order to also reduce the magnetizing current giving that soft edges too. (The magnetizing current is the main root cause for audible noise as it is responsible for the attractive forces between the transformer core halves causing vibration and thereby producing audible noise.)

However, the effects of the delays that are mentioned above can prevent the possibility to go to zero power and can also prevent the possibility to increase the switching frequency as is required for a soft edge of the magnetizing current. Examples disclosed herein provide a solution to this issue.

One or more of the examples described herein address issues in the prior art that prevent both no load and reduction of the magnetizing current, even with delay compensation that is provided by the components identified with reference 301 in FIG. 3. In this way, examples disclosed herein can provide a high frequency resonant converter capable of both going to no load while switching, and also allows for a burst mode with soft start and soft stop that is able to reduce the magnetizing current during soft start and soft stop. This can bring the audible noise back to an acceptable level.

Figure 4:
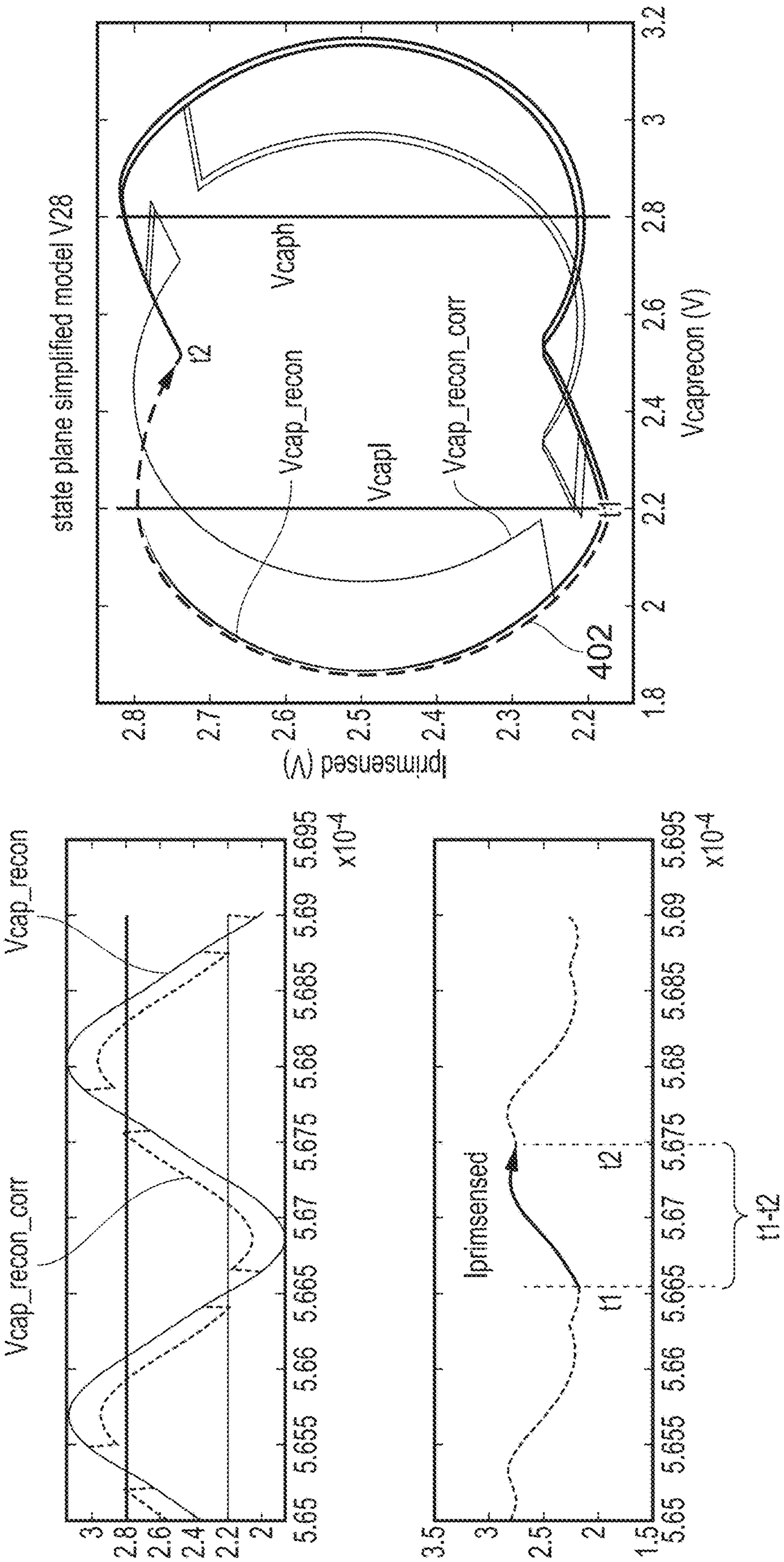
FIG. 4 shows signals of a resonant converter with capacitor voltage control, such as the one of FIG. 3, which includes a delay compensation mechanism.

FIG. 4 shows signals of a resonant converter with capacitor voltage control, such as the one of FIG. 3, which includes a delay compensation mechanism. The converter operates at moderate power level.

The left plot of FIG. 4 shows the signals in the time domain:

Vcap_recon: divided and DC biased resonant capacitor voltage.

Vcaprecon_corr: Vcap_recon delay compensated by scaled resonant current.

Vcaph, Vcapl: control levels for the cycle by cycle comparators (that can also be referred to as the upper- and lower-voltage-threshold-values).

Iprimsensed: sensed resonant current.

The right side plot shows the same signals plot in a state plane representation.

In the state plane, the (capacitive divided version of the) voltage across the resonant capacitor is plotted as the horizontal axis against the resonant current plotted at the vertical axis. In the left plot, time flows from left to right. The resonant current between t1 and t2 represents the interval where the secondary side rectifier conducts, giving a high resonance frequency. In the state plane, time relates to a point of the curve moving around clockwise in time. The interval t1-t2 is plotted as a dashed line 402.

Plotting such a state plane gives advantages as information can be obtained from the plotted trajectories that is related to the dynamic behavior of the converter. When the axes are scaled properly, the part of the trajectory during the interval where the secondary diodes conduct is then part of a circle with a midpoint (called forcing voltage) at the voltage across the resonating components. During the interval t1-2, the forcing voltage is the half bridge node voltage-reflected output voltage=Vbus-reflected output voltage. Vbus is the resonant converter supply voltage. As the capacitive divider is biased with a 2.5V on chip reference voltage via a large series resistor in this example, the divided resonant capacitor voltage (called vcap_recon in FIG. 3 and FIG. 4) has a DC level of 2.5V.

With fixed upper- and lower-voltage-threshold-values, a well defined trajectory occurs for the region where power is delivered to the load as shown in FIG. 4.

Figure 5:
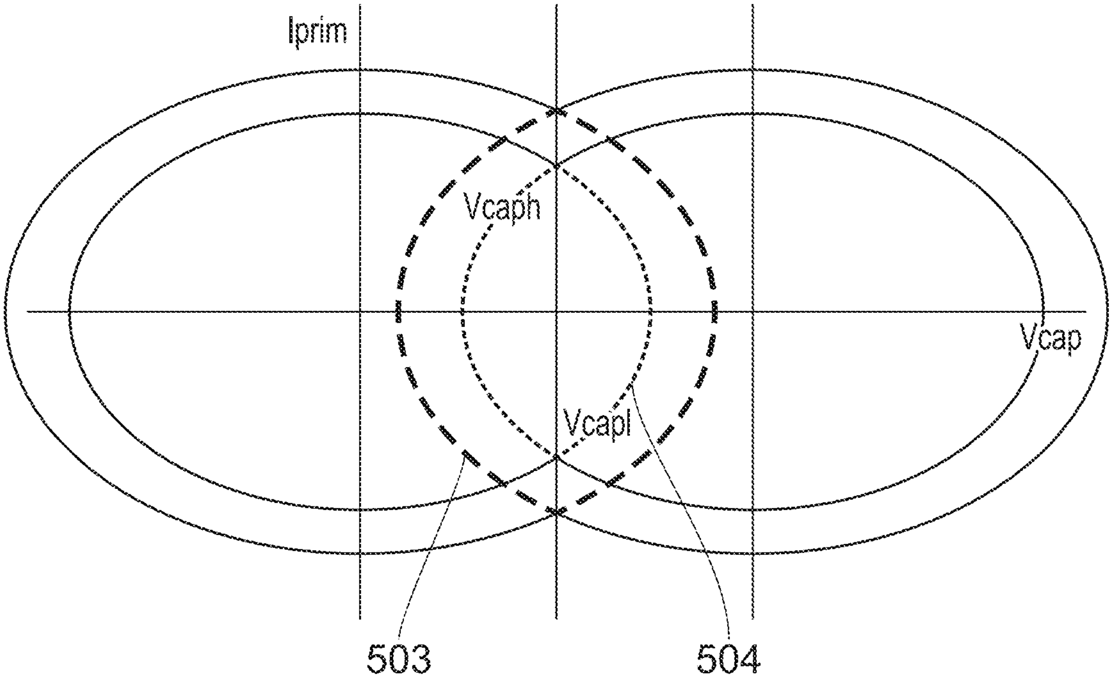
FIG. 5 shows a situation for no load.

FIG. 5 shows a situation for no load (neglecting delays). In FIG. 5, DeltaV (which equals Vcaph-Vcapl; i.e. the upper-voltage-threshold-value minus the lower-voltage-threshold-value) is set to 0 in order to make zero power. Due to zero power, the resonant current (Iprim on the vertical axis) is then only magnetizing current. Now there are different trajectories possible as indicated by the larger, outer trajectory 503 and smaller, inner, trajectory 504, as 2 of many examples. This means that both the magnetizing current and the switching frequency are undefined. The smaller and larger refers to the smaller or larger peak values, which determine the size of the trajectory.

When taking into account delays, it follows from simulations that even at low load (i.e., not necessarily zero load), the power cannot be properly controlled and the frequency can drift away to a maximum frequency while power drifts away to 0. With the overall feedback loop that regulates the output voltage closed, the result is an unstable regulation.

We will now describe ways of addressing these issues.

Figure 6:
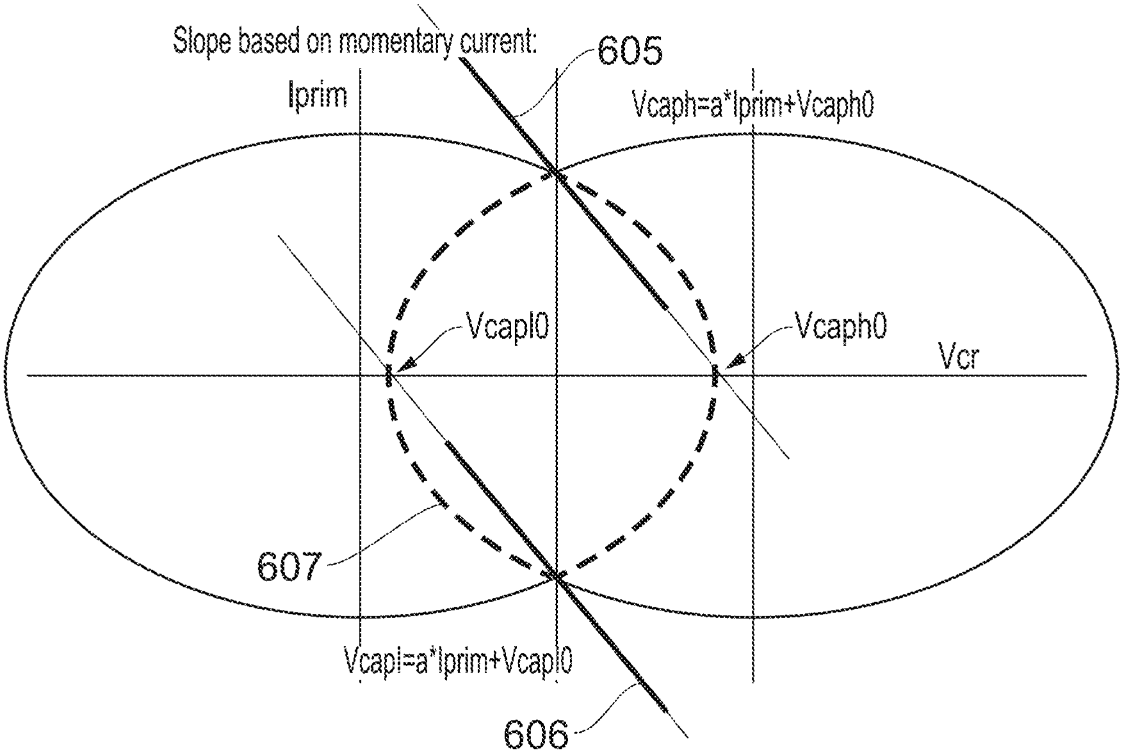
FIG. 6 shows a first step of adding a slope compensation signal to the Vcap levels (i.e., the upper- and lower-voltage-threshold-values)

FIG. 6 shows a first step of adding a slope compensation signal to the Vcap levels (i.e., the upper- and lower-voltage-threshold-values). The slope is based on the resonant current (called Iprim in FIG. 6). This results in Vcap levels being Vcaph=Vcaph0+a×Iprim and Vcapl=Vcapl0+a×Iprim. Where: Vcaph is the upper-voltage-threshold-value; Vcaph0 is a constant that defines the position of the upper-voltage-threshold-value slope in the state plane;

Vcapl is the lower-voltage-threshold-value; Vcapl0 is a constant that defines the position of the lower-voltage-threshold-value slope in the state plane; a is a constant that defines the gradient of the slope; and Iprim is the resonant current, which can also be referred to as a measured current signal. Vcaph0 occurs if a×Iprim=0, so it defines the crossing with the x axis. Since 'a' is set to a specific value, therefore Vcaph0 can be considered as defining a vertical position of the sloped line in the plot. The same is true for Vcapl0.

Vcaph (the upper-voltage-threshold-value) is shown in FIG. 6 with reference 605. Vcapl (the lower-voltage-threshold-value) is shown in FIG. 6 with reference 606. During operation of the resonant converter, as represented by the dashed line in FIG. 6, the states of the switches of the resonant converter are changed when the trajectory intersects the upper-voltage-threshold-value 605 and the lower-voltage-threshold-value 606. In this way, the system is forced to follow a trajectory where the effective Vcap levels (i.e., the upper- and lower-voltage-threshold-values) are 0.

Due to the slope compensation, the effective vcap levels will become positive when the trajectory is too small and become negative when the trajectory is too large. The switching cycle will therefore be forced to follow the desired convergence to a desired stable trajectory shown in FIG. 6.

Figure 7:
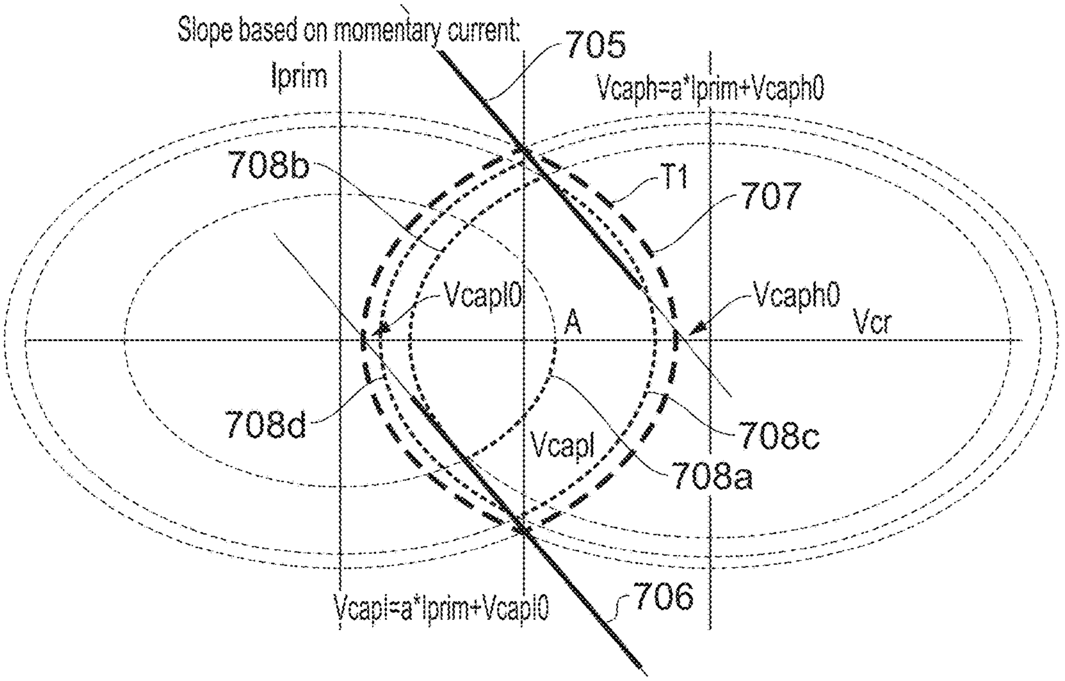
FIG. 7 shows convergence to a single well defined trajectory.

FIG. 7 shows convergence to a single well defined trajectory. FIG. 7 shows how this convergence works using the option to construct the state plane trajectories being defined by forcing voltage and radius.

Starting at point A, the system will follow the dot-dashed trajectory as defined by the current-dependent vcap levels 705, 706 and finally converges to the dashed trajectory 707. That is, staring from point A:

- Operation continues according to the trajectory identified as **708*a* until the measured voltage signal crosses the lower-voltage-threshold-value 706**;
- Operation continues according to the trajectory identified as **708*b* until the measured voltage signal crosses the upper-voltage-threshold-value 705**;
- Operation continues according to the trajectory identified as **708*c* until the measured voltage signal crosses the lower-voltage-threshold-value 706. It can be seen that trajectory 708*c* is further out than trajectory 708*a*;**
- Operation continues according to the trajectory identified as **708*d* until the measured voltage signal crosses the upper-voltage-threshold-value 705. It can be seen that trajectory 708*d* is further out than trajectory 708*b*;**
- Operation has now converged on the final, well-defined, trajectory that is shown in FIG. 7 with a dashed line 707.

Points that still need to be addressed are:

- how to set the proper Vcap levels to get the desired accuracy of the primary current or output current as function of DeltaV; and
- how to define it such that it can be used over the complete load range in a stable way.

issues in relation to the first point result from the fact that the Vcap level at the switch off moment determines the energy to be converted to the load, while the primary peak current at the switch off moment is not directly clear but will affect the cycle energy. So, the result is then that the converted energy depends on an unknown variable.

According to a first aspect of the present disclosure, examples disclosed herein can apply the slope only during a well-defined part of the Vcr window in order to prevent multiple trajectories.

Figure 8:
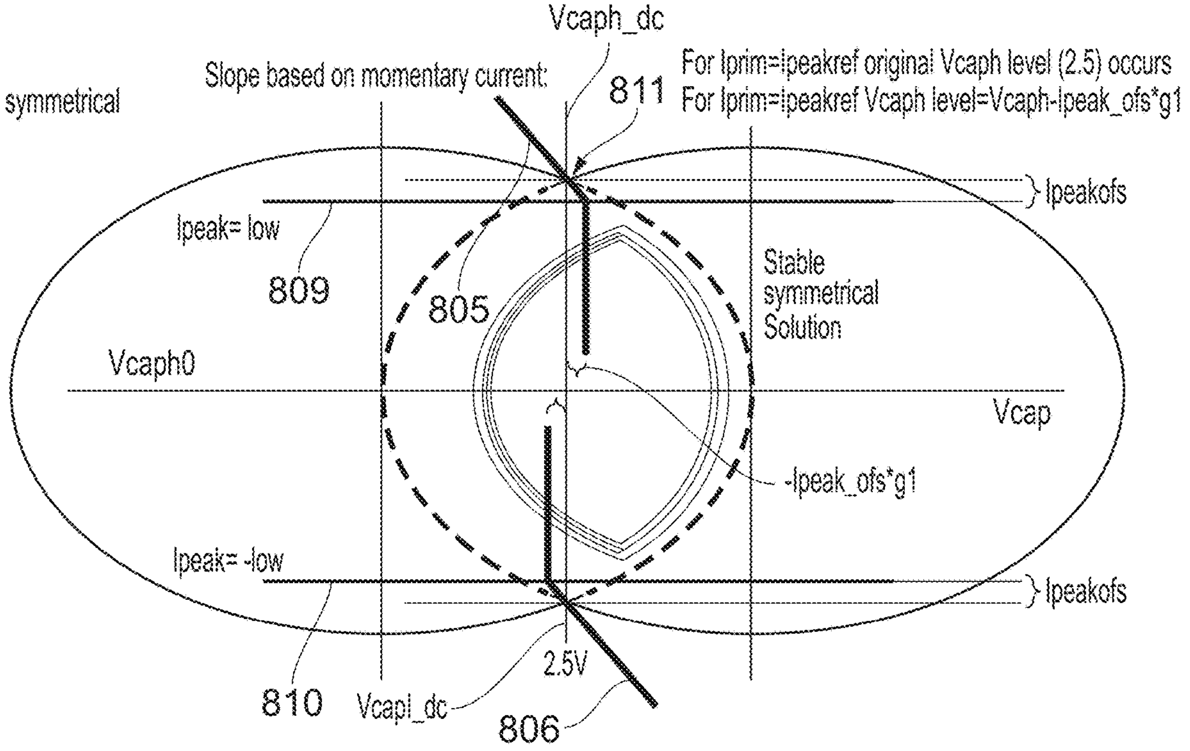
FIG. 8 shows a state plane representation of operation according to an aspect of the present disclosure.

FIG. 8 shows a state plane representation of operation according to an aspect of the present disclosure. In this example, the upper- and lower-voltage-threshold-values 805, 806 can either be set as: a value that depends on the measured current signal (Iprim)—this is the sloped regions that are illustrated in FIG. 8; or a value that is independent of the measured current signal (Iprim)—this is the vertical regions that are illustrated in FIG. 8, and can be considered as a fixed Vcap (or threshold) level.

In this way, the slope is only applied during the part of the trajectory where multiple trajectories are possible. The upper- and lower-voltage-threshold-values 805, 806 are also set in order to define the changeover from the region with slope to the region with fixed Vcap level in a specific way. The fixed Vcap levels are used in the region where accurate resonant current amplitude is needed.

We will now describe an example embodiment of a controller for a resonant converter with reference to the state plane representation of FIG. 8. The resonant converter is for supplying electrical energy from a supply source to a load. As described above, the resonant converter includes a first switch and a second switch connected in series with each other between the supply source and a reference terminal (such as a ground terminal). The resonant converter has a high-side switch half cycle when the first switch is closed and the second switch is open. The resonant converter has a low-side switch half cycle when the first switch is open and the second switch is closed. The resonant converter also has a resonant tank that is electrically connected to the first and second switches. The resonant tank includes at least a resonant capacitor. In some examples, the resonant tank also includes a resonant inductor and a transformer, and optionally a resonant capacitor at the other side of the transformer (for a CLLC converter). Most of these features of the resonant converter are included in various drawings of the present application, including FIG. 1.

The controller receives a measured current signal (Iprim) that represents the current flowing in the resonant tank. The controller also receives a measured voltage signal (Vcap) that represents the voltage at a predetermined point in the resonant tank. Furthermore, the controller receives a power setting signal (ctrl_p, which will be discussed in more detail below), which defines a requested power level for the load.

If the measured current signal (Iprim) is greater than an upper-low-load-current-threshold (low) 809, then the controller sets the upper-voltage-threshold-value (Vcaph) 805 based on the measured current signal (Iprim). This is the sloped region of the upper-voltage-threshold-value (Vcaph) 805 that is shown in FIG. 8. As discussed with reference to FIG. 7, the sloped region enables a well-defined switching frequency to be achieved for low load operation. If the measured current signal (Iprim) is not greater than the upper-low-load-current-threshold (low) 809, then the controller sets the upper-voltage-threshold-value (Vcaph) 805 based on the power setting signal (ctrl_p) but independent of the measured current signal (Iprim). This is the vertical region of the upper-voltage-threshold-value (Vcaph) 805 that is shown in FIG. 8. It represents traditional operation of a resonant converter such that it can be controlled according to requested power level for the load, in operating conditions for which the compensation that is provided by the sloped region of the upper-voltage-threshold-value (Vcaph) 805 is not required. I.e., the load is not so low that the resonant converter can reliably operate according to its usual closed loop control.

The controller operates similarly for the lower-voltage-threshold-value (Vcapl) 806. That is, if the measured current signal (Iprim) is less than a lower-low-load-current-threshold (−low) 812, then the controller sets the lower-voltage-threshold-value (Vcapl) 806 based on the measured current signal (Iprim). This is the sloped region of the lower-voltage-threshold-value (Vcapl) 806 that is shown in FIG. 8. If the measured current signal (Iprim) is not less than the lower-low-load-current-threshold (−low) 810, then the controller sets the lower-voltage-threshold-value (Vcapl) 806 based on the power setting signal (ctrl_p) but independent of the measured current signal (Iprim). This is the vertical region of the lower-voltage-threshold-value (Vcapl) 806 that is shown in FIG. 8.

Once the upper- and lower-voltage-threshold-values (Vcaph, Vcapl) 805, 806 have been set in this way, the controller can:

in response to the measured voltage signal exceeding the upper-voltage-threshold-value (Vcaph) 805, open the first switch and close the second switch; and in response to the measured voltage signal dropping below the lower-voltage-threshold-value (Vcapl) 806, open the second switch and close the first switch.

It will be appreciated that it is these switching operations that cause the trajectories in the state plane diagrams to change direction.

In this way, with reference to the resonant current levels Ipeak=low (the upper-low-load-current-threshold 809) and Ipeak=−low (the lower-low-load-current-threshold 810):

The Vcaph level becomes independent of the resonant current for Iresonant<low; and The Vcapl level becomes independent of the resonant current for Iresonant>−low Tshi example results in a stable trajectory because the trajectory size increases when it is too small and it reduces when it is too large. Therefore, it converges to one stable solution.

The ability to increase the trajectory when it is smaller than desired results in deltaV=Vcaph−Vcapl>0 for the regions with the fixed Vcap levels (i.e., the vertical portions of the upper- and lower-voltage-threshold-values (Vcaph, Vcapl) 805, 806). Therefore, the trajectory area will increase due to deltaV being positive, causing the trajectory to increase with every full trajectory loop. This will result in every trajectory that is smaller then the trajectory that is shown in FIG. 8 as a dashed line converging to the dashed line, which represents a stable trajectory. Similarly, trajectories that are larger than the trajectory that is shown in FIG. 8 as a dashed line will also converge towards the dashed line trajectory because, due to the slope, the Vcap levels (i.e., upper- and lower-voltage-threshold-values (Vcaph, Vcapl) 805, 806) become negative when the trajectory is larger than the dashed line. This is because negative deltaV cause the trajectory to become smaller for every complete loop (=switching cycle), as explained already in relation to FIG. 7.

Ipeak_ofs

The deltaV value in FIG. 8 shows a variable 'Ipeak_ofs' as being the distance from Ipeak=low (the upper-low-load-current-threshold 809) to the point on the upper-voltage-threshold-value line (Vcaph) 805 where Vcaph becomes 2.5V. The same is shown for the distance from Ipeak=−low (the upper-low-load-current-threshold 809) to the point on the lower-voltage-threshold-value line (Vcapl) 806 where Vcapl. As discussed above, a slope at the Vcap levels improves performance for the no load situation in order to provide convergence to a single well defined trajectory (see FIG. 7).

The Ipeak_ofs value (which can be considered as an offset value for the sensed current signal) defines a region where the slope is extended towards a positive Vcaph value (the dotted curves in FIGS. 9 to 14) and a negative Vcapl value (the dashed curves in FIGS. 9 to 14).

Figure 9:
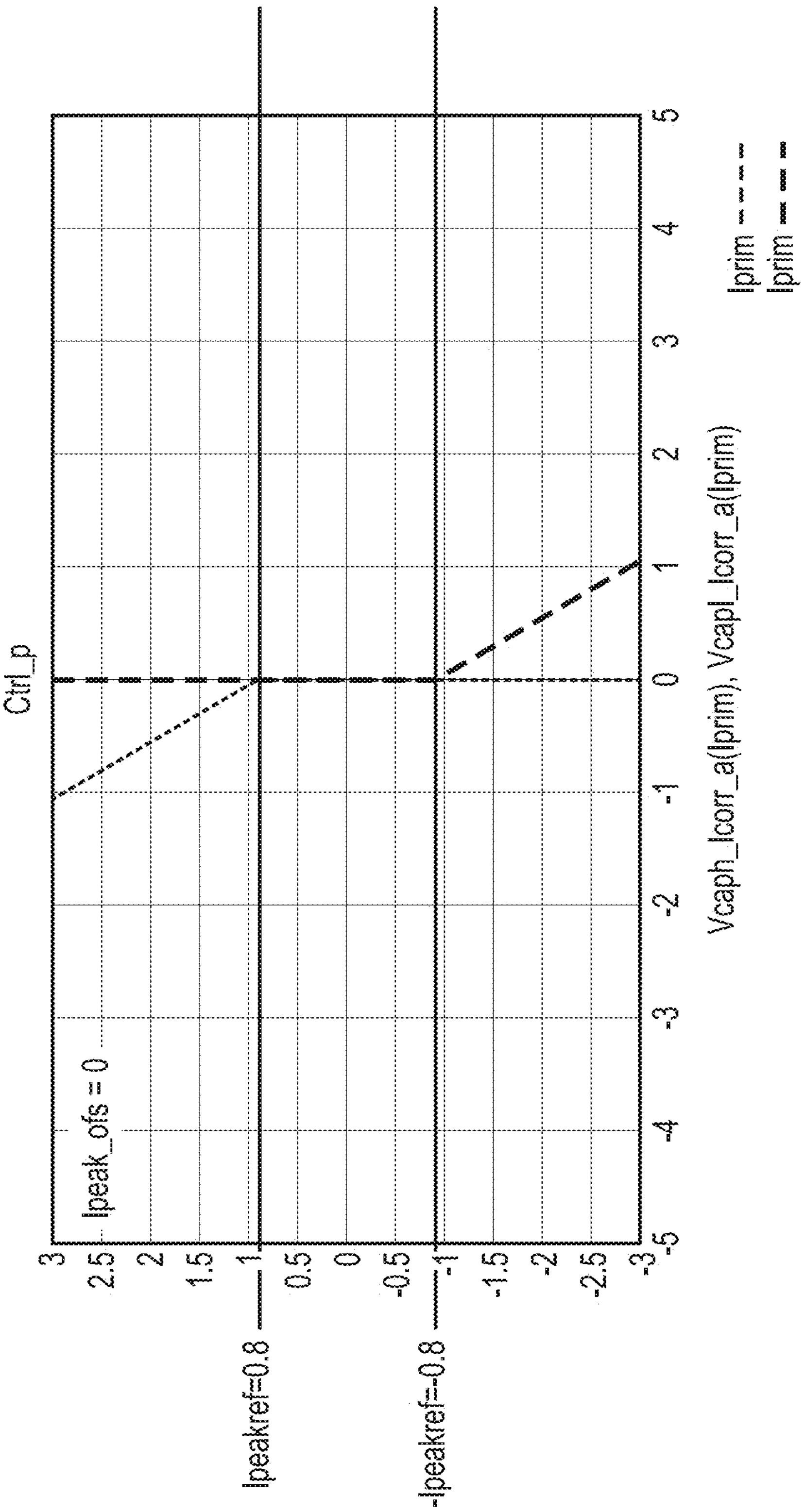
FIG. 9 shows the situation with zero load (deltav=0, giving Vcaph=Vcapl=0) and without Ipeak_ofs added.

FIG. 9 shows the situation with zero load (deltav=0, giving Vcaph=Vcapl=0) and without Ipeak_ofs added. In this situation, no well-defined trajectory is possible based on the capacitor voltage control method as explained in relation to FIG. 7 because an infinite number of switching frequencies is possible.

Figure 10:
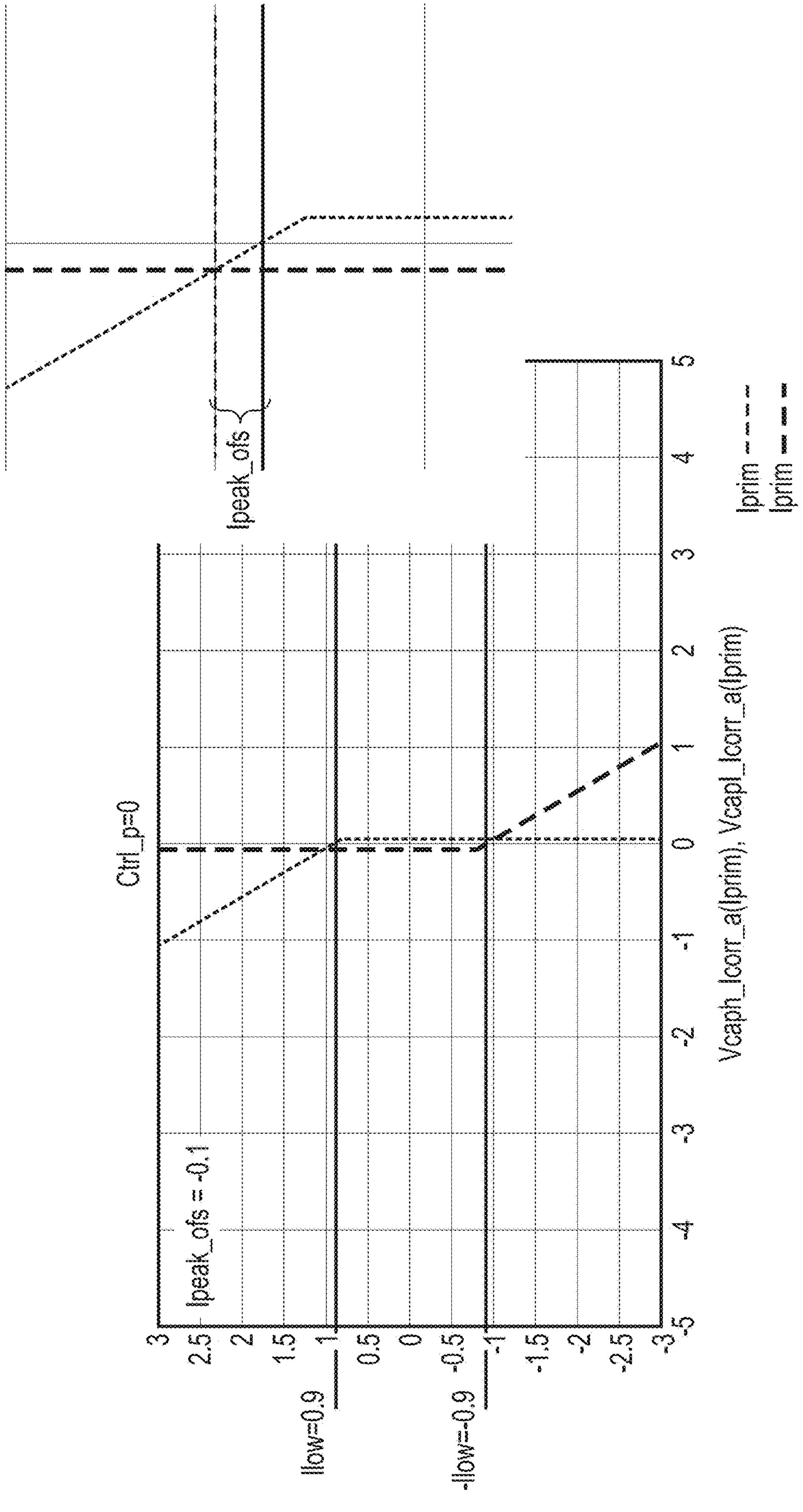
FIG. 10 shows the same situation with zero load and with Ipeak_ofs added.

FIG. 10 shows the same situation with zero load and with Ipeak_ofs added.

Figure 11:
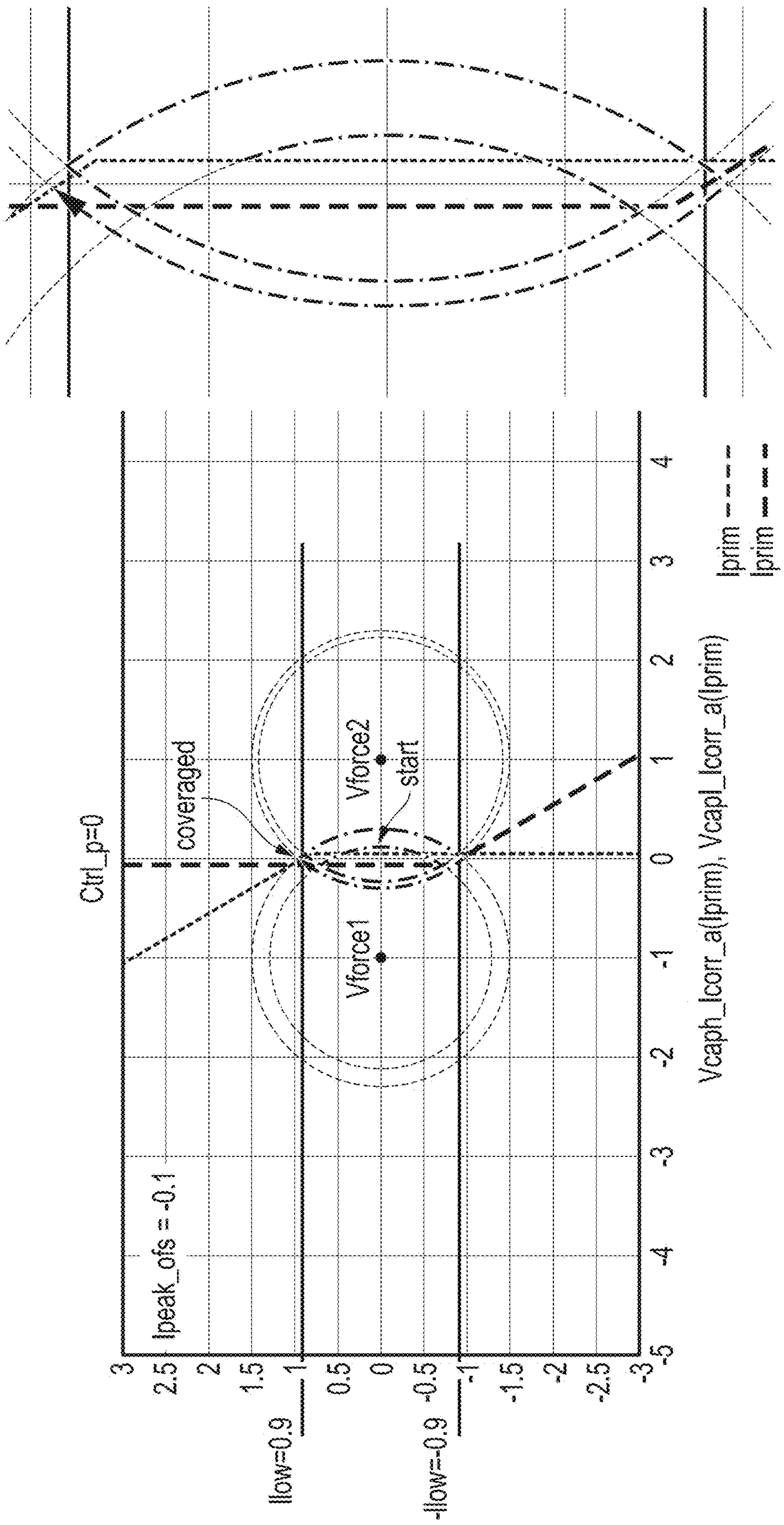
FIG. 11 shows how a well-defined trajectory is possible for the situation of FIG. 10, based on the capacitor voltage control method as explained above.

FIG. 11 shows how a well-defined trajectory is possible for the situation of FIG. 10, based on the capacitor voltage control method as explained above. FIG. 11 shows how the trajectory (shown as a dot-dashed line) converges from a smaller trajectory to a stable trajectory.

Figure 12:
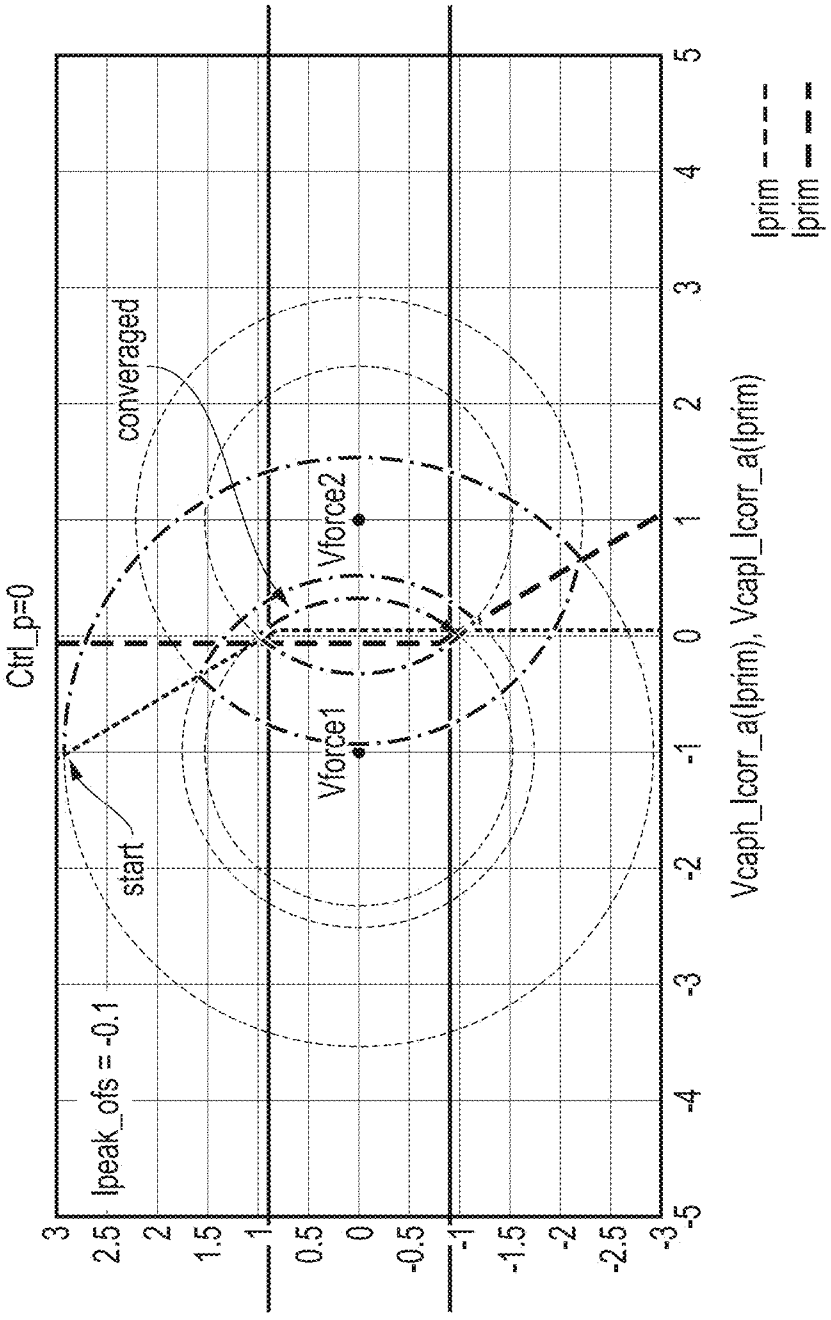
FIG. 12 shows how the trajectory (again shown as a dot-dashed line) converges from a larger trajectory to a stable trajectory for the situation of FIG. 10.

FIG. 12 shows how the trajectory (again shown as a dot-dashed line) converges from a larger trajectory to a stable trajectory for the situation of FIG. 10.

In practical situation with additional delays, the finishing of each half cycle is later than the actual time than the measured voltage signal actually crosses the Vcaph, Vcapl values.

Figure 13:
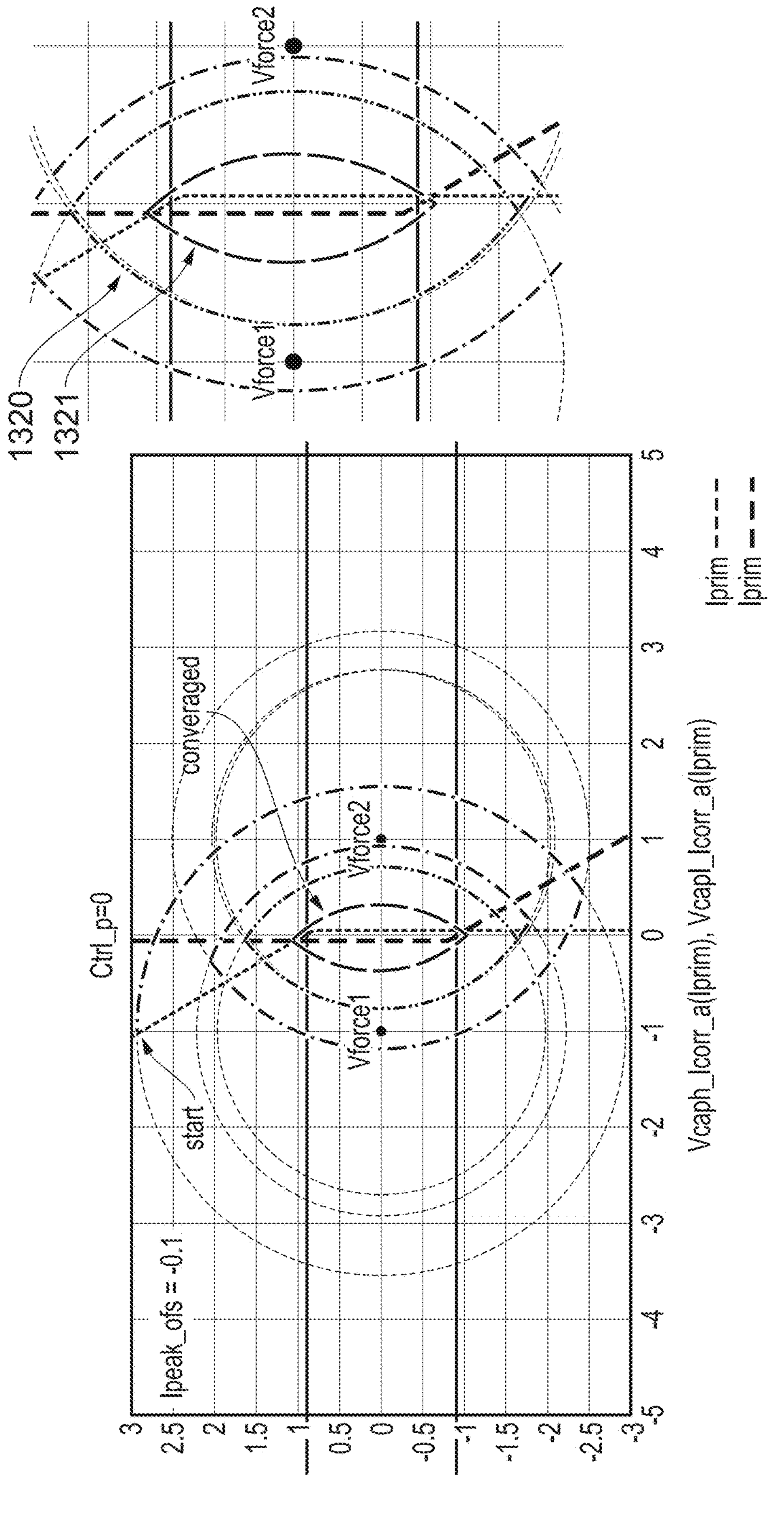
FIG. 13 shows the same settings as FIG. 12 but now with an additional delay.

FIG. 13 shows the same settings as FIG. 12 but now with an additional delay between: i) the cycle by cycle comparators determining that the measured voltage signal crosses one of the Vcaph, Vcapl values; and ii) the voltage at the half bridge node reacting.

The effect is that at every crossing of the Vcap levels, a larger trajectory is followed than defined. This results in a stable, but larger than expected, trajectory (see the dash-dot-dot line 1320). The trajectory that would be achieved if there were no additional delay, and switching occurred instantaneously when the vcap levels were crossed, is shown as the long dashed line 1321.

Figure 14:
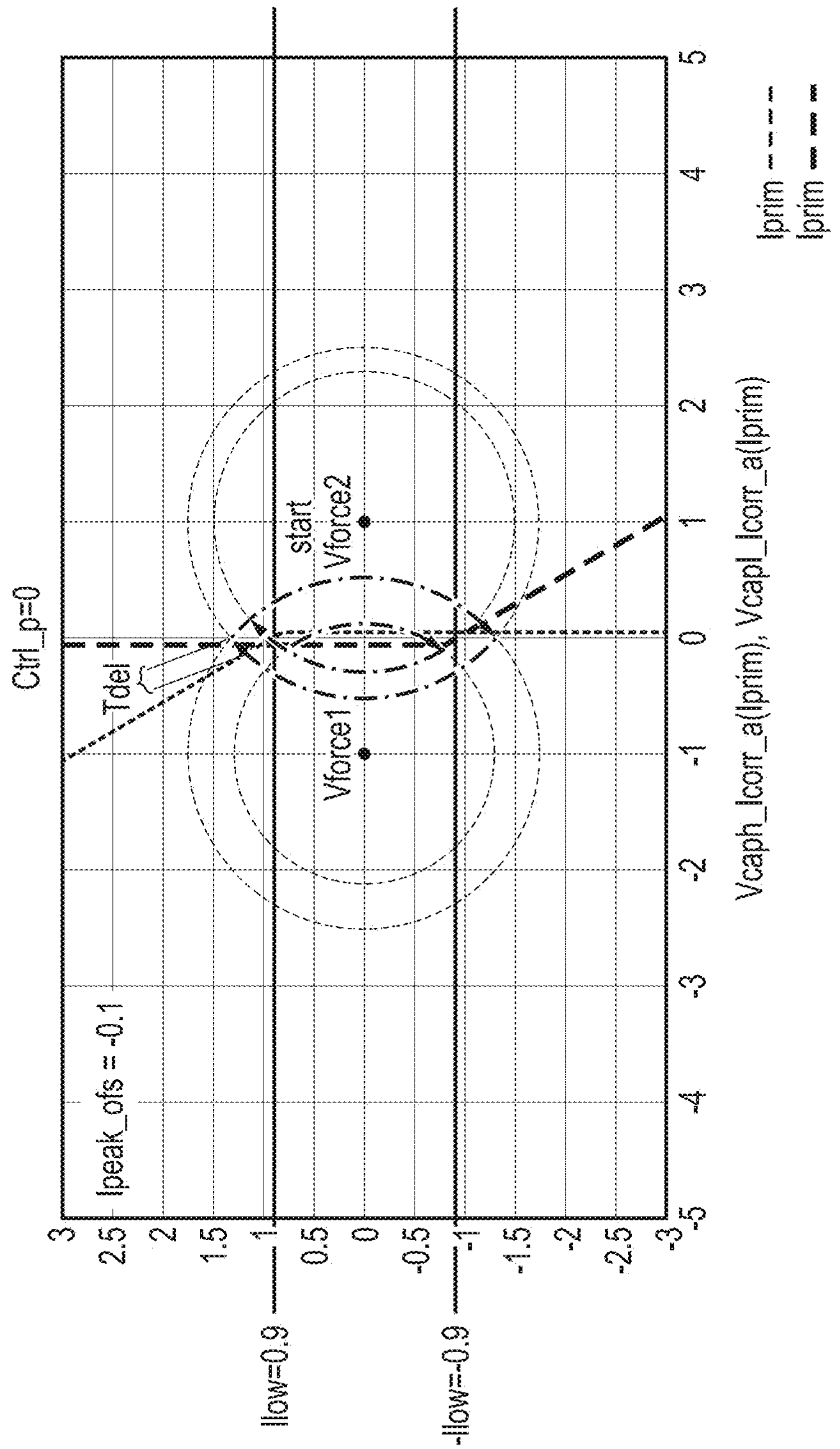
FIG. 14 shows the situation coming from a smaller trajectory and converging to a steady state solution.

FIG. 14 shows the situation coming from a smaller trajectory and converging to a steady state solution.

Also here it is clear from the figure that a larger trajectory will be followed than desired. In order to keep zero power, the effective vcap levels should be zero. The effective Vcap levels are the value of the Vcr coordinate of p(Vcr,Iresonant) of the trajectory at the moment that the half bridge node switches. In the trajectory, this can be seen as the instant that the trajectory changes direction. In FIGS. 13 and 14, these levels are still zero, so they define zero load as required.

For larger delays, it may not be possible to achieve zero power because the trajectory will become larger with larger delays. In order to address this, two things can be done:

1. The slope compensation can be made steeper, thereby forcing a larger trajectory to be finished at as smaller Vcaph value and larger Vcapl value.
2. deltaV can be made negative and the Ipeak_ofs value can be increased in order to allow stable convergence to a steady state trajectory.

Definition of the Settings as Function of Load

For the main feedback loop that regulates the output voltage of the total converter, it is important to keep the loop gain under control as the loop gain is related to the margins for stability of the main regulation loop and bandwidth (ability to react on load transients with a certain settling speed).

Regarding the cycle by cycle part, the contribution to this loop gain is defined by the transfer from main control parameter (deltaV) to average output current of the current in the rectifier diodes over a switching cycle. For the capacitor voltage control method, deltaV is directly proportional to converted energy per switching cycle. This is explained above with reference to FIG. 2.

As also discussed above, examples of the present disclosure can add a slope compensation and shift the vcap levels. Changing over to this situation suddenly could result in an undesirable discontinuity in the transfer from deltaV to converted energy per switching cycle. It is therefore a feature of some aspects of the present disclosure to activate the functionality discussed above as a function of the control parameter deltaV.

In this relation, it is important to understand that for operation at moderate to full power, the functionality described above in terms of defining the upper- and lower-voltage-threshold-values as a function of the measured current signal may not be enabled, thereby enabling deltaV to be made proportional to the main control variable of the converter (ctrl_p) according to the equations:

$$Vcaph = \text{Ctrl\_p} * \text{gain1}$$

$$Vcapl = -\text{Ctrl\_p} * \text{gain1}$$

Figure 15:
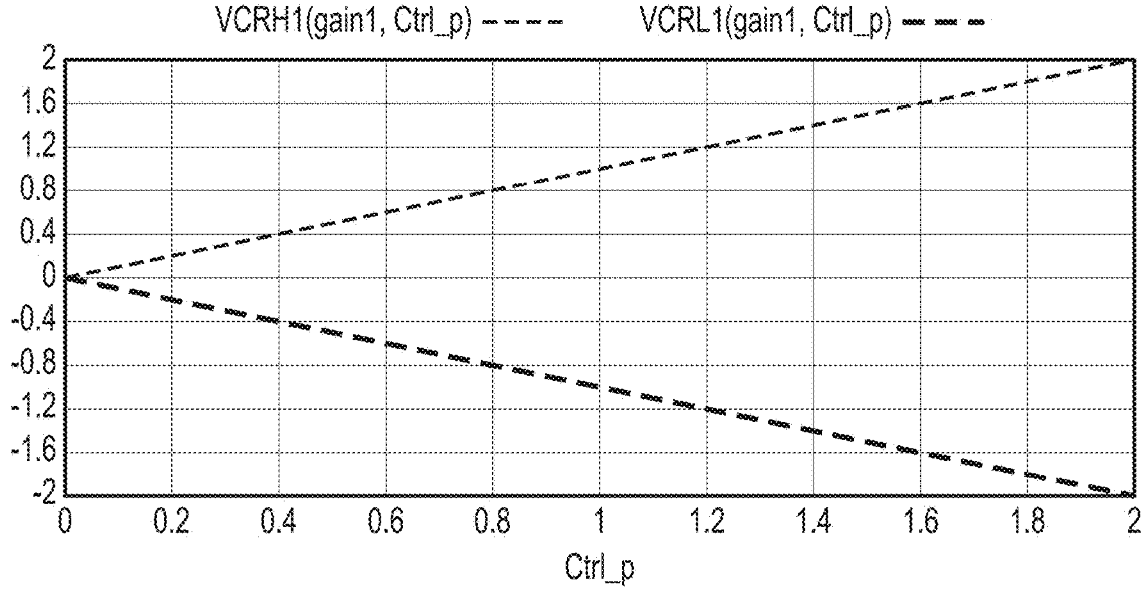
FIG. 15 shows a plot of vcaph and vcapL levels as function of ctrl_p.

FIG. 15 shows a plot of vcaph and vcapL levels as function of ctrl_p, where for the two equations above gain1=1.

The gain from ctrl_p to deltaV is in a practical converter determined by some settings such as choices of the resonant tank components and the capacitive divider ratio, but for the purposes of this discussion only the principle is important. Assuming that no load relates to ctrl_p=0 and maximum load relates to ctrl_p=2, it turns out that for a high frequency LLC converter with internal delays the actual output power is shifted by an offset to a more positive value as result of the delay. Using the delay compensation method that is represented by components 301 in FIG. 3, the shift is reasonably well compensated. However, for small powers, such as lower than approximately 5% of full load, the converter may not be able to operate in a stable way.

In order to address this, as we will now discuss, examples of the present disclosure can activate their functionality in a specific way such that the transfer from ctrl_p to output current is kept as constant as possible, and preferably it does not become zero or even change sign.

Ipeak Definition

This section relates to how the upper- and lower-low-load-current-thresholds can be set. These thresholds are described above with reference to FIG. 8, for example, and will collectively be identified in this section as Ipeak.

The first part of this section is related to the peak current that defines the slope compensation above a value where the resonant current is larger that Ipeak.

Figure 16:
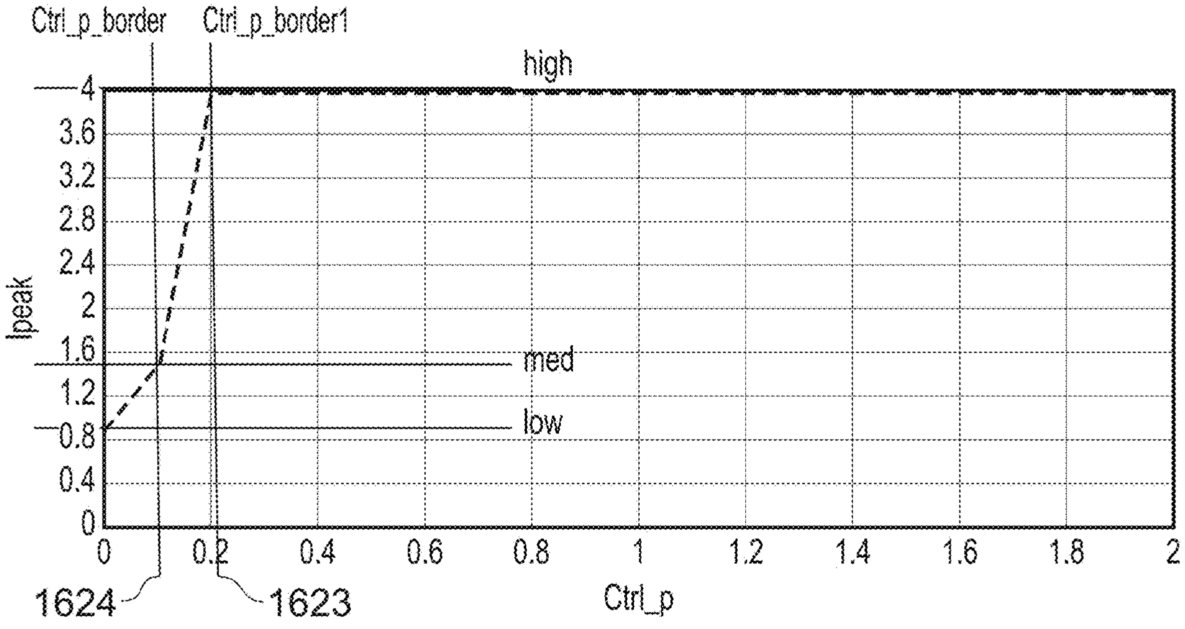
FIG. 16 shows a plot that illustrates how Ipeak (i.e., the upper- and lower-low-load-current-thresholds) can be defined as function of ctrl_p (i.e., the power setting signal)

FIG. 16 shows a plot that illustrates how Ipeak (i.e., the upper- and lower-low-load-current-thresholds) can be defined as function of ctrl_p (i.e., the power setting signal).

As will be discussed below, and as represented by FIG. 16, the controller of the resonant converter sets the value of the upper- and lower-low-load-current-thresholds based on the received power setting signal (ctrl_p).

During moderate to large power levels, no slope should be added and therefore the Ipeak level should be always above the peak of the resonant current. Therefore, a high-load threshold (Ctrl_p_border1) 1623 is used to define a boundary value for ctrl_p. The high-load threshold (Ctrl_p_border1) 1623 has a value of 0.2 in FIG. 16. When ctrl_p is higher than the high-load threshold (Ctrl_p_border1) 1623, Ipeak is set at a value (in the example of FIG. 16 it is set at 4A) that is not expected to influence operation of the resonant converter at such relatively high loads. Therefore, no slope will occur and the Vcap levels (i.e., the upper- and lower-voltage-threshold-values) are fixed and defined by ctrl_p independently of the resonant current.

In this way, if the received power setting signal (ctrl_p) is greater than a high-load threshold (Ctrl_p_border1) 1623 then the controller of the resonant converter:

sets the value of the upper-low-load-current-threshold (which can be considered as Ipeak) as a high-load constant value (4A in FIG. 16). The high-load constant value has a relatively high magnitude such that the slope does not affect operation of the resonant converter for relatively high load operation; and sets the value of the lower-low-load-current-threshold (which can be considered as −Ipeak) as a high-load constant value (−4A in FIG. 16).

As shown in FIG. 16, if the received power setting signal (ctrl_p) is less than the high-load threshold (Ctrl_p_border1) 1623, then the controller:

sets the value of the upper-low-load-current-threshold (Ipeak) as a value that is less than the high-load constant value; and sets the value of the lower-low-load-current-threshold (−Ipeak) as a value that is less than the high-load constant value.

More specifically, for the example of FIG. 16, if the received power setting signal (ctrl_p) is less than the high-load threshold (Ctrl_p_border1) 1623, then the controller:

sets the value of the upper-low-load-current-threshold (Ipeak) as a function of the received power setting signal (ctrl_p), such that the value of the upper-low-load-current-threshold (Ipeak) reduces as the value of the received power setting signal (ctrl_p) reduces; and set the value of the lower-low-load-current-threshold (−Ipeak) as a function of the received power setting signal (ctrl_p) such that the value of the lower-low-load-current-threshold (Ipeak) reduces as the value of the received power setting signal (ctrl_p) reduces.

As the value of the ctrl_p signal reduces, the sloped part of the Vcaph, Vcapl definitions (that are identified in FIG. 8 with references 805 and 806, for example) shift towards the x-axis. There comes a moment when the trajectory that represents operation of the resonant converter intersects with the sloped part of the Vcaph, Vcapl definitions, and therefore the sloped parts of Vcaph, Vcapl starts influencing the switch-off moments of the resonant converter. This means that the gain from ctrl-p to the power at the output of the resonant converter is from that moment onwards not only defined by the gain curve (FIG. 15) but also by the slope. As a result, the effective gain gets larger. Therefore, the transfer from ctrl_p to Ipeak (dIpeak/dCtrol_p)) in FIG. 16 is limited to a maximum in order to maintain stable operation. (Also taking into account that the delays in the system give additional dynamics.) This effect can result in a problematic region when going towards zero power.

This problematic region for going to zero load for the example of FIG. 16 has been identified as starting at values of ctrl_p less than 0.1. Therefore, an additional medium-load threshold (Ctrl_p_border) 1624 is used. The medium-load threshold (Ctrl_p_border) 1624 is set such that the point where the slope starts influencing the transfer from ctrl_p to power output of the resonant converter is in the region of FIG. 16 between med and low in order to maintain the required stable behavior, as discussed above. The level of the medium-load threshold (Ctrl_p_border) 1624 is set according to the resonant peak current that occurs at Ctrl_p=Ctrl_p_border. When Ctrl_p is reduced below the medium-load threshold (Ctrl_p_border) 1624, Ipeak is gradually reduced to a zero-load-current-value (e.g., 0.9 A in FIG. 16). This can be referred to as a 'low' level at zero load (i.e., when ctrl_p=0).

In this way, the controller:

sets the value of the upper-low-load-current-threshold (Ipeak) as a zero-load-current-value (e.g., 0.9 A in FIG. 16) if the received power setting signal (ctrl_p) is zero; and set the value of the lower-low-load-current-threshold (−Ipeak) as a zero-load-current-value (e.g., −0.9 A in FIG. 16) if the received power setting signal (ctrl_p) is zero.

As shown in FIG. 16, the relationship between Ipeak (on the vertical axis) and ctrl_p (on the horizontal axis) is different for: i) values of ctrl_p that are between the high-load threshold (Ctrl_p_border1) 1623 and the medium-load threshold (Ctrl_p_border) 1624; and ii) values of crtl_p that are less than the medium-load threshold (Ctrl_p_border) 1624.

More specifically, if the received power setting signal (ctrl_p) is less than the high-load threshold (Ctrl_p_border1) 1623 (e.g., 0.2 in FIG. 16), then the controller:

sets the value of the upper-low-load-current-threshold (Ipeak) as:

a first function of the received power setting signal (ctrl_p) if the received power setting signal (ctrl_p) is greater than the medium-load threshold (Ctrl_p_border) 1624 (e.g., 0.1 in FIG. 16); and a second function of the received power setting signal (ctrl_p) if the received power setting signal (ctrl_p) is less than the medium-load threshold (Ctrl_p_border) 1624; and set the value of the lower-low-load-current-threshold (−Ipeak) as:

the first function of the received power setting signal (ctrl_p) if the received power setting signal (ctrl_p) is greater than the medium-load threshold (Ctrl_p_border) 1624 (e.g., 0.1 in FIG. 16); and the second function of the received power setting signal (ctrl_p) if the received power setting signal (ctrl_p) is less than the medium-load threshold (Ctrl_p_border) 1624.

As shown in FIG. 16, the first function and the second function are linear functions. The first function is steeper than the second function, in that the value of Ipeak reduces more quickly with respect to ctrl_p for the second first than it does for the second function. It will be appreciated that in other examples, non-linear functions could be used.

As explained in relation to FIG. 9, the effect will be that the trajectory is forced to follow a stable path according to the deltaV value and the resonant current defining the slope added to deltaV in that situation. In order to illustrate this functionality, the situation for several point of FIG. 16 is given in FIGS. 17 to 22. In each of these figures, the upper-voltage-threshold-value is shown as a dotted line and the lower-voltage-threshold-value is shown as a dashed line.

The values taken in this example are:

Gain1=1, slopegain=0.5 (=dvcap/dIresonant), and

Ipeak_ofs=−0.1

Figure 17:
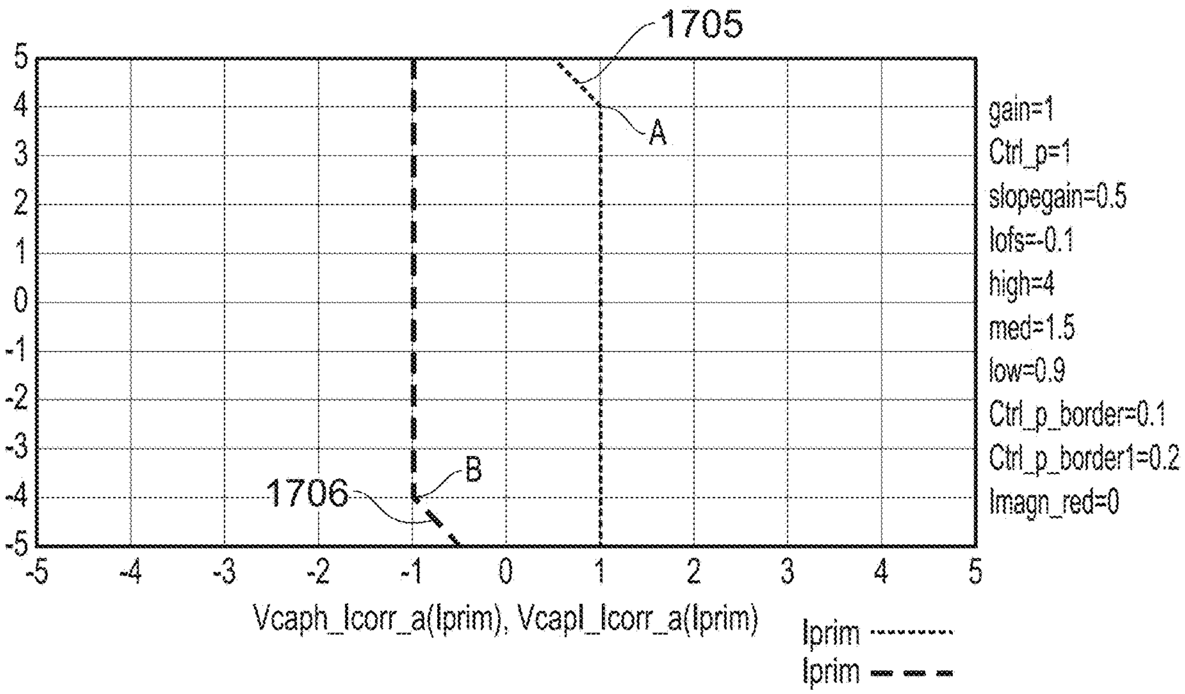
FIG. 17 shows the situation for half load (ctrl_p=1)

FIG. 17 shows the situation for half load (ctrl_p=1). In the context of assessing performance of the resonant converter at low loads, the half load of FIG. 17 can be considered as a relatively high load.

This can be considered as a normal situation with DeltaV=Vcaph-Vcapl=2 in this case. The region where the slope compensation starts is still out of range for the resonant current being at a value high=4, −4. The slope compensation is such that at Ires='high' (points A and B) there is no effect of Ires on the vcap level so the Vcaph level=Vcaph then as defined by Ctrl-p. The Ipeak_ofs=−0.1 slightly changes this value, and this will be discussed later. In any case, the trajectory of operation in FIG. 17 is expected to intersect with the vertical regions of the upper- and lower-voltage-threshold-values.

Figure 18:
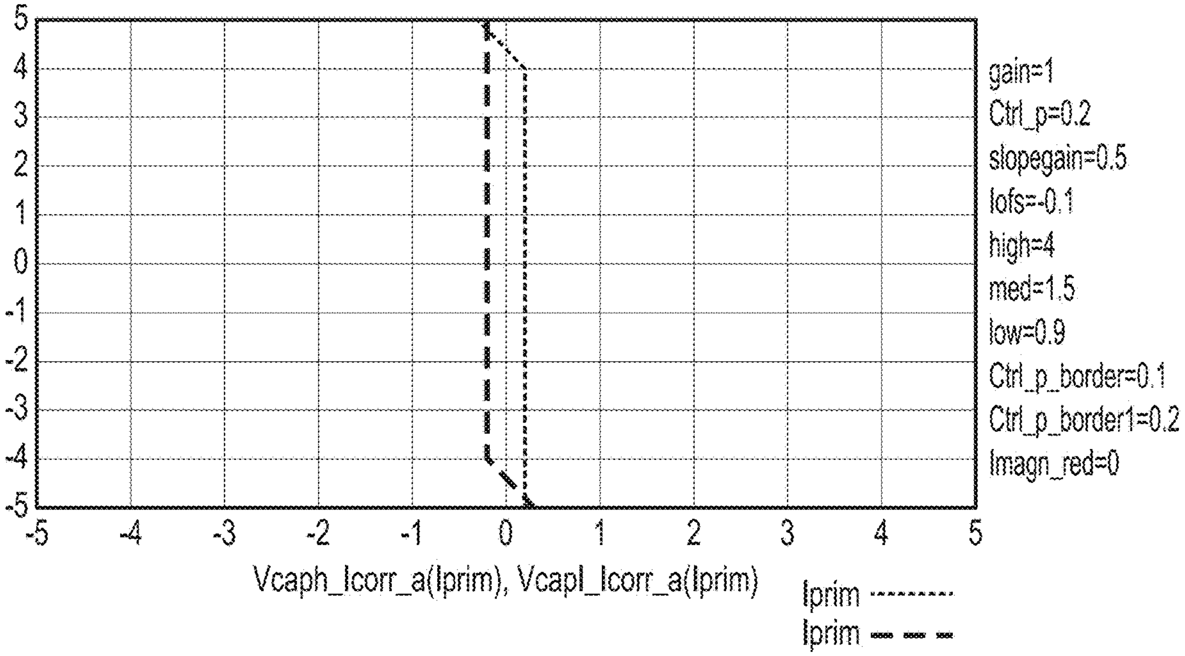
FIG. 18 shows the situation for the region where the functionality that is illustrated in FIG. 16 is started to be enabled (Ctrl-p=Ctrl_p_border1)

FIG. 18 shows the situation for the region where the functionality that is illustrated in FIG. 16 is started to be enabled (Ctrl-p=Ctrl_p_border1). The load has reduced, which results in deltaV being reduced to 0.4, thereby giving smaller Vcap values than in FIG. 17. But for the rest, the situation is the same as in FIG. 17. The slope compensation starts at Ires='high' (points A and B as they are labelled in FIG. 17).

Figure 19:
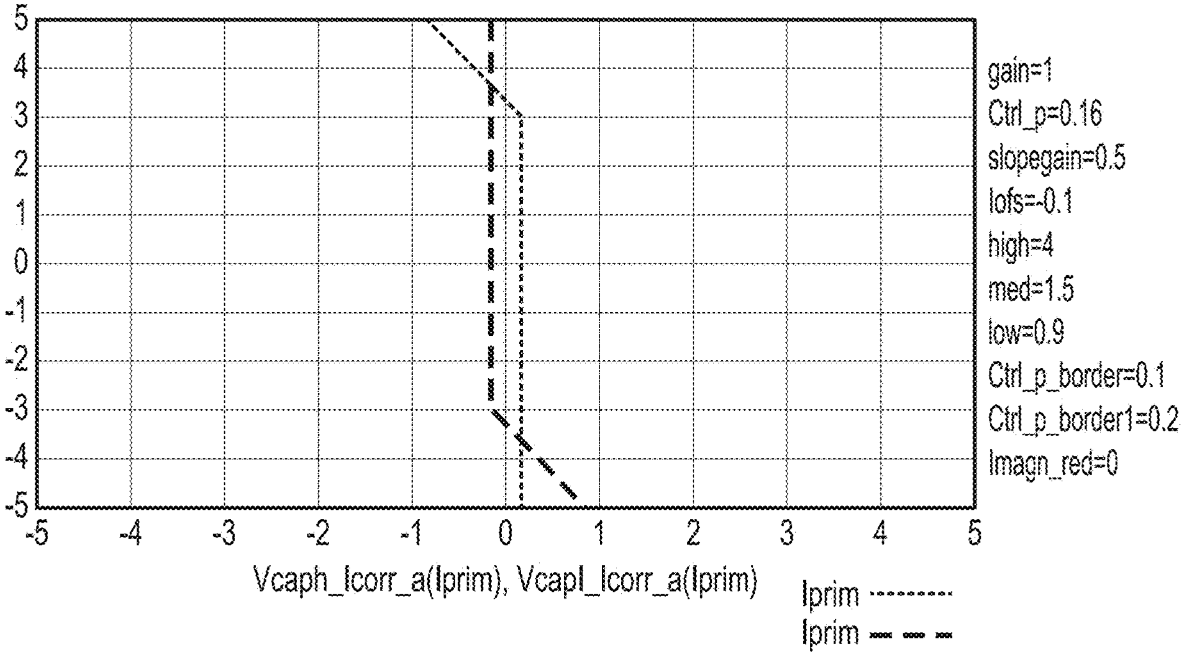
FIG. 19 shows the situation partway through the region where Ipeak is being reduced based on the value of ctrl_p, but the sloped regions of the upper- and lower-voltage-threshold-values are not affecting the control of the resonant converter yet.

FIG. 19 shows the situation partway through the region where Ipeak is being reduced based on the value of ctrl_p, but the sloped regions of the upper- and lower-voltage-threshold-values are not affecting the control of the resonant converter yet. As ctrl_p is between Ctrl_p_border1 and Ctrl_p_border, the peakcurrent at Vcaph level=Vcaph is between High and Med. Which is 3 in the example of FIG. 19, which is the points A,B where the slope starts.

Figure 20:
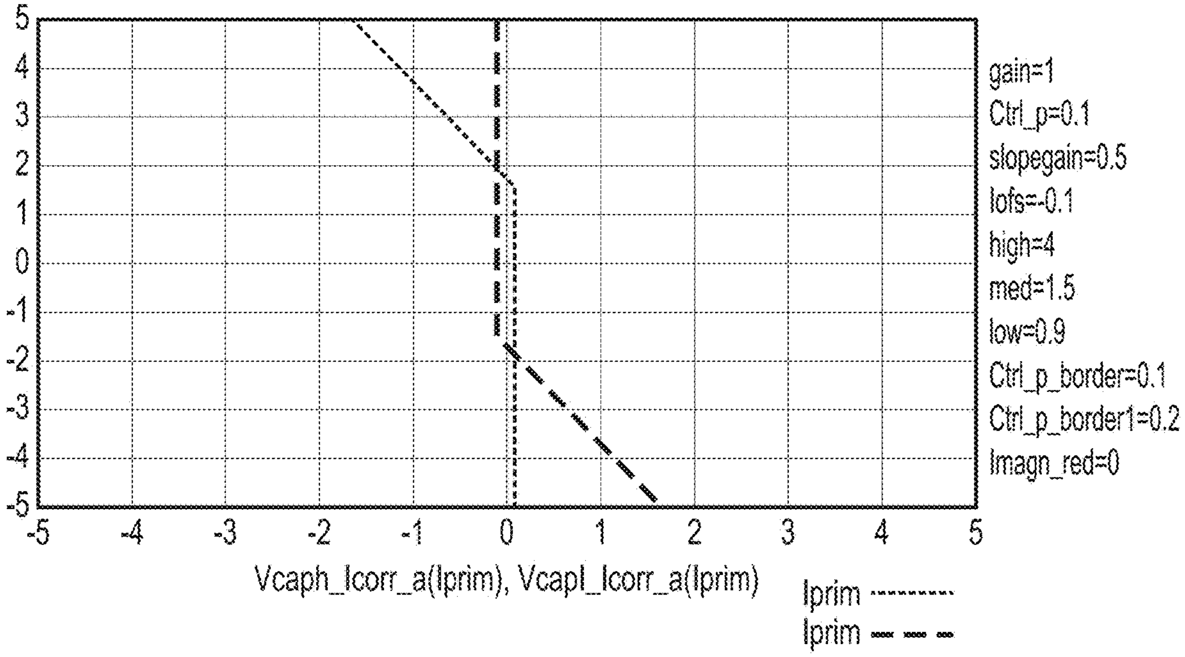
FIG. 20 shows the situation at the edge where the sloped regions of the upper- and lower-voltage-threshold-values take over control.

FIG. 20 shows the situation at the edge where the sloped regions of the upper- and lower-voltage-threshold-values take over control. At this point, the resonant peak current at the applied ctrl_p value starts crossing the region where the slope occurs. This means that the trajectory is now also forced to the desired stable path by the slope compensation together with the fact that outside the region with slope compensation the deltaV=Vcaph-Vcapl is still larger than 0. This ensures that also for smaller trajectories the situation converges to the single desired trajectory.

Figure 21:
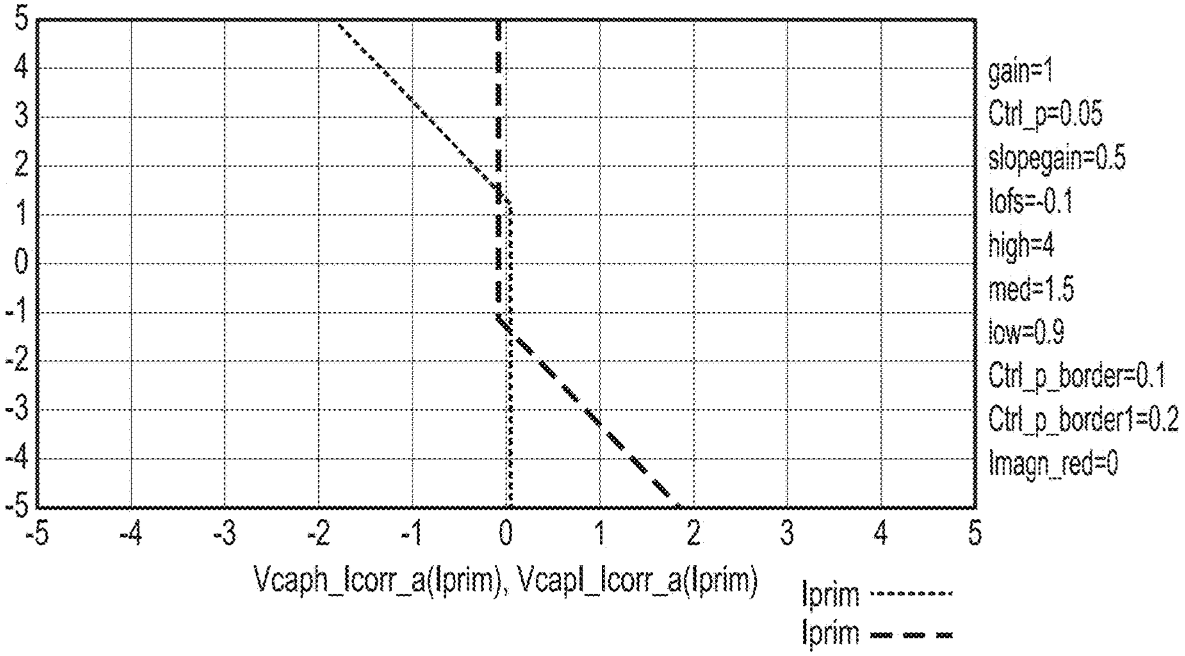
FIG. 21 shows a further narrowing down of the trajectory for smaller ctrl_p.

FIG. 21 shows a further narrowing down of the trajectory for smaller ctrl_p by the applied slope being at a lower Ires value and made stable by the slope being extended to positive Vcaph levels and negative Vcalp levels.

Figure 22:
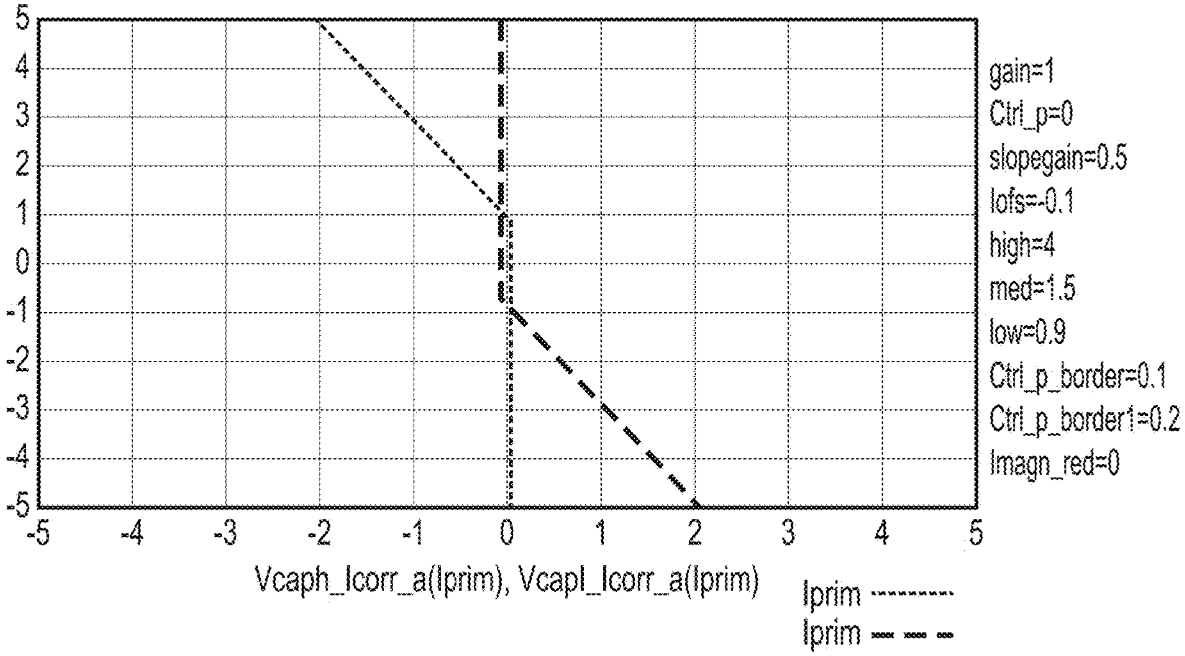
FIG. 22 shows the zero load situation.

Finally, FIG. 22 shows the zero load situation where the resonant peak current is defined by the 'low' value (the zero-load-current-value that is described above with reference to FIG. 16).

Effect of Ipeak_ofs

Beneficially, the slope compensation is not used for moderate and large power levels because it would result in the Vcap levels being defined based on the resonant current, and therefore would not accurately define the power. It is beneficial to have a smooth changeover to low load situation, where the slope compensation is actively used in the region where the decision to finish the half cycle is taken, is desirable. Therefore, in some examples the controller may not instantly enable the slope for low loads. For this reason, examples disclosed herein can keep a region where no slope occurs always active but shift the points A and B (as labelled in FIG. 17) slowly outside of the active region as function of Ctrl_p. It will be appreciated from the above discussion that the points A and B represent the upper- and lower-low-load-current-thresholds, which define the points at which the upper- and lower-voltage-threshold-values transition between: i) being independent of the measured current signal; and ii) being dependent of the measured current signal.

The effect of Ipeak_ofs is to ensure that the deltaV remains positive for the region where the slope compensation is not active and also for zero load, in order to make sure that the trajectory always converges to one stable trajectory.

Figure 23:
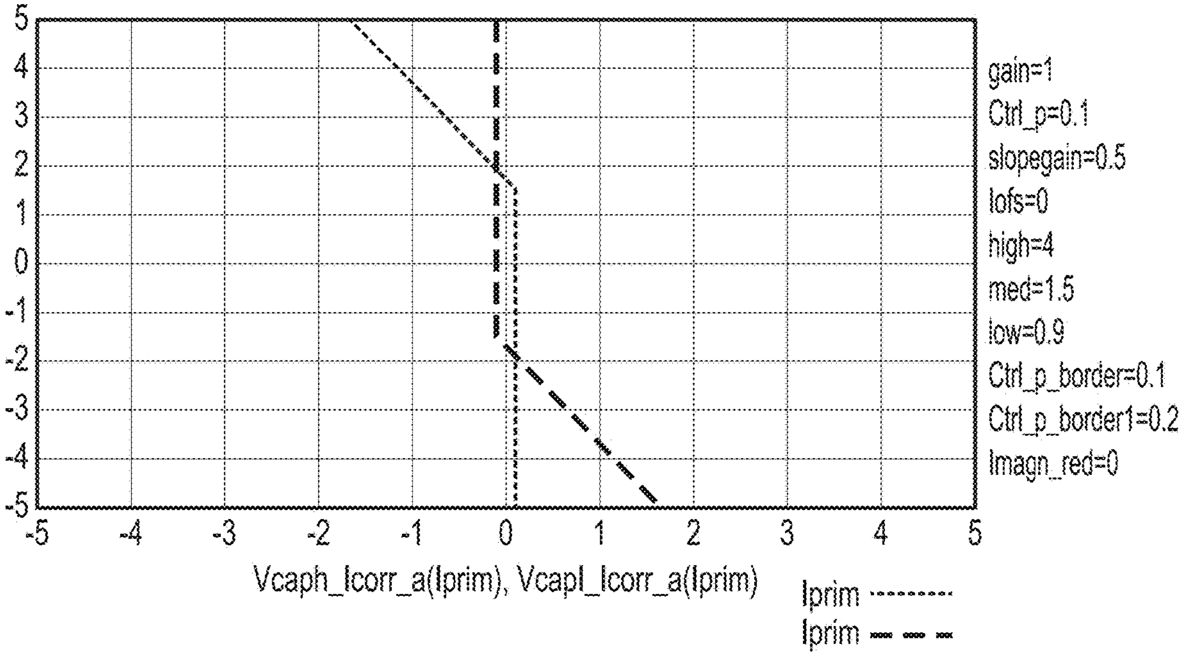
FIGS. 23-25, show how the power (Ctrl_p) is made smaller (and finally made 0 in FIG. 25), deltaV goes to 0 at zero load.
Figure 24:
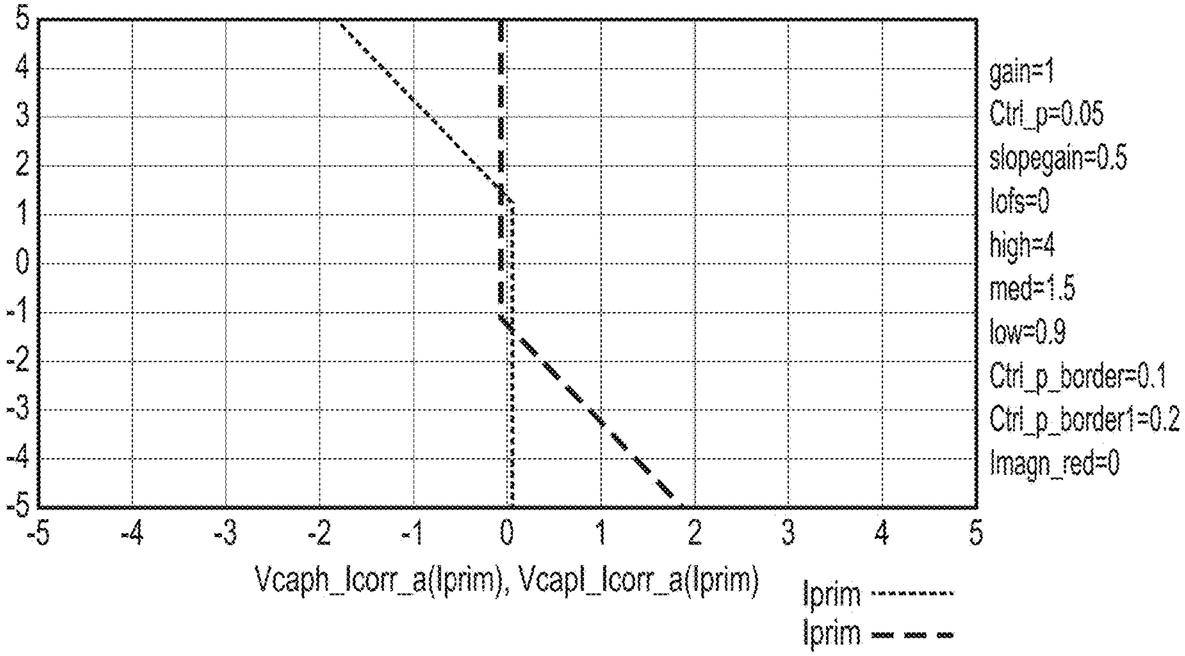
Figure 25:
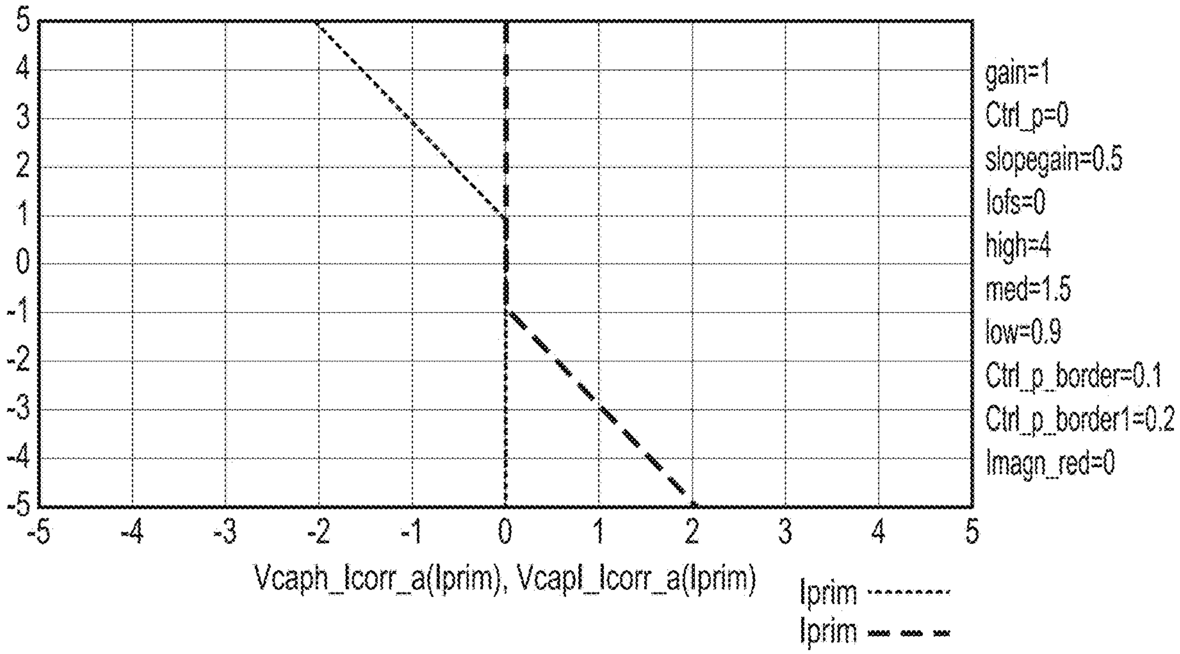

Without additional measures, however this would mean that deltaV goes to 0 at zero load. This is shown in FIGS. 23-25, where the power (Ctrl_p) is made smaller and finally made 0 in FIG. 25. In each of these figures, the upper-voltage-threshold-value is shown as a dotted line and the lower-voltage-threshold-value is shown as a dashed line.

From FIG. 25, and also the earlier explanation related to FIGS. 9 to 11, it is clear that in this case we have an undefined trajectory for zero load.

However, Ipeak_ofs value should not be activated instantly as function of ctrl_p because this would also give sudden changes in the transfer from ctrl_p to power and therefore would risk irregular and unstable behavior. On the other hand, it may not be desirable to have Ipeak_ofs active for normal operation (i.e., operation where the trajectory does not intersect with a sloped region of the Vcaph and Vacpl definitions). This is because Ipeak_ofs gives an additional offset with respect to both Vcap levels as a function of ctrl_p, and therefore results in a shift in the output power of the resonant converter. Therefore, Ipeak_ofs is reduced in a smooth way such that the gain influence of reducing Ipeak_ofs to zero is spread out over a relatively large region, thereby accepting some error in the power definition in this region.

Figure 26:
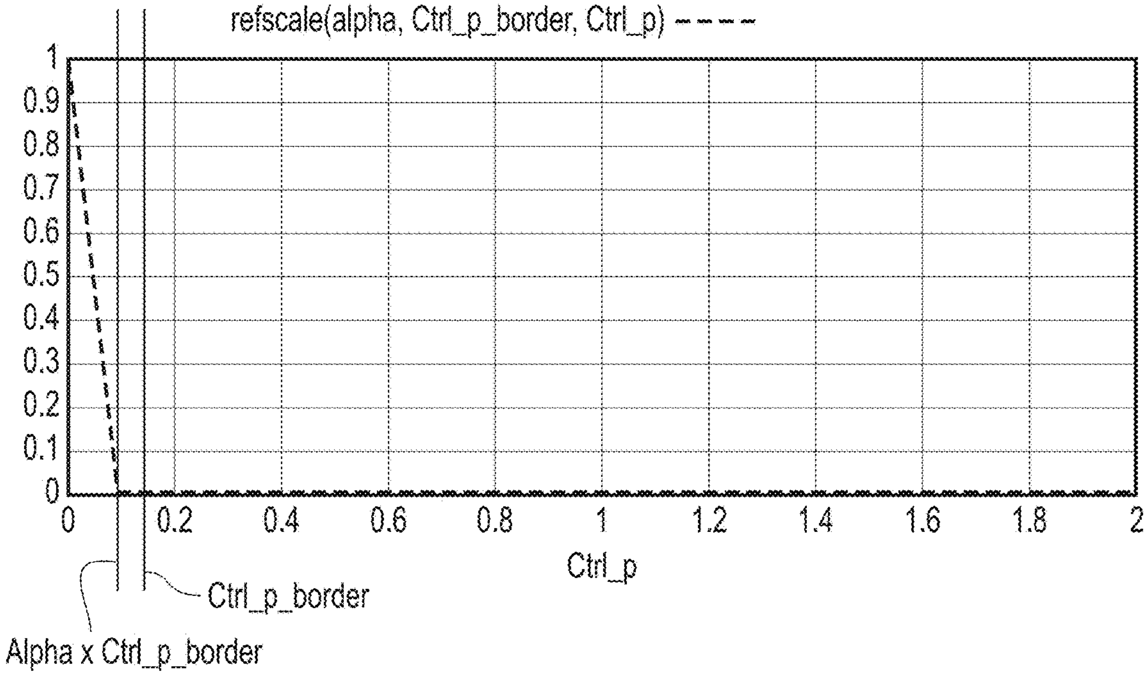
FIG. 26 shows an offset-current-application-power-threshold.

In order to make a smooth changeover, the Ipeak_ofs value in this example is gradually increased from 0 to the required value defined by a variable 'refscale' going from 0 to 1 over the ctrl_p region going down from Ctrl_p_border to 0. Optionally an additional factor alpha can be defined such that the increase starts at alpha×Ctrl_p_border. This is illustrated in FIG. 26, and can be referred to as an offset-current-application-power-threshold.

As already shown in FIGS. 17-22, deltaV for larger ctrl_p values is much larger than the effect of Ipeak_ofs such that the transfer from ctrl_p to power is hardly influenced by the Ipeak_ofs value as it only becomes dominant at very small power levels close to 0.

Optionally, a ctrl_p dependent offset could be defined and added to deltaV in order to compensate for the error in the transfer from ctrl_p to power due to Ipeak_ofs for low load. This could also allow to tune the power to 0 with the offset and make Ipeak_ofs larger as probably required for systems with larger delays. (See also the earlier description with reference to FIG. 14.)

Definition of the Amount of Magnetizing Reduction During a Soft Start and Soft Stop Part of a Burst-on Interval During soft start and soft stop intervals, it can be beneficial to further reduce the magnetizing current because sudden changes in the magnetizing current causes a sudden change in the force at which the core halves attract each other. This can be the main reason for audible noise. As during burst-off no magnetizing currents flow, and during burst-on a sudden change occurs to normal resonant currents, this explains the audible noise.

A second effect is that windings attract each other, also causing audible noise. So during soft start and soft stop, the goal is to make both changes smooth in order to eliminate high frequency components.

In order to reduce audible noise due to these 2 effects, separate functionality is included as part of the present disclosure.

1. Reduce audible noise from attracting forces between windings due to modulation of the resonant part of the current when output power is delivered.
2. Reduce audible noise from attracting forces between core halves due to the magnetizing part of the current by further reduction of the magnetizing current.

Figure 27:
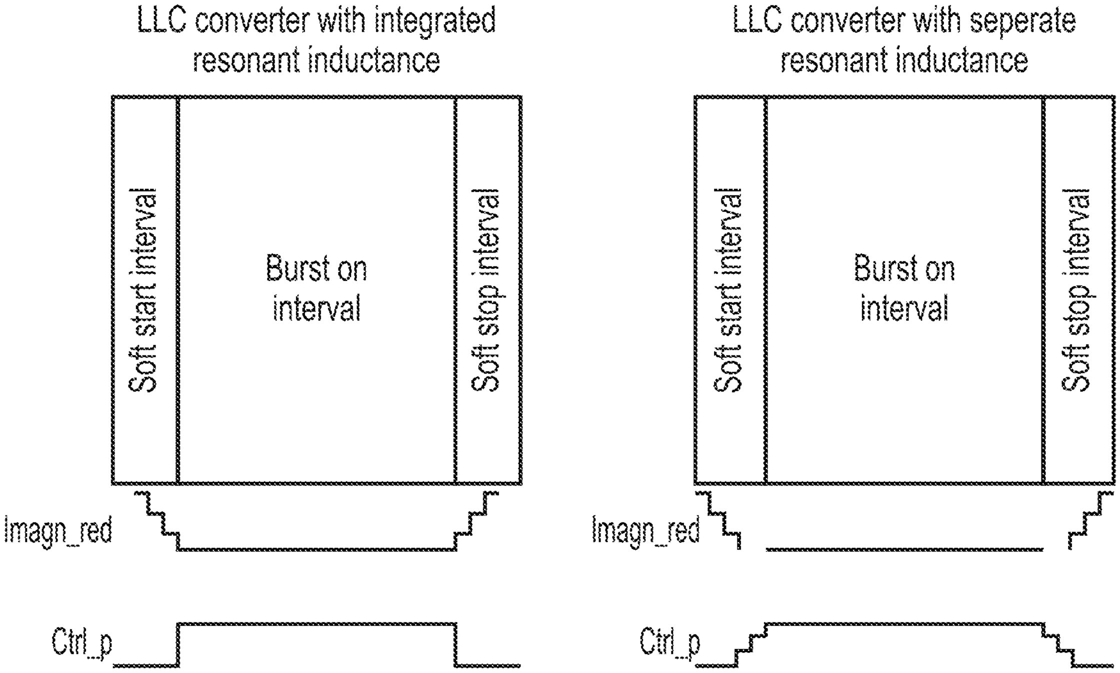
FIG. 27 shows soft start and soft stop.

Point 1 can be realized by the functionality as described so far to make zero power by reducing ctrl_p to 0 during the soft start and soft stop intervals. This is shown in FIG. 27 at the right side part where ctrl_p is at a fixed level during the burst on interval and being reduced to zero in a smooth way during the soft start and soft stop part of the burst on interval.

Point 2 can be realized by further reduction of Ipeakref below the 'low' value by subtracting an additional term 'Imagn_red' from the 'low' value. As explained in relation to FIG. 22, the Ipeak value 'low' that occurs at ctrl_p=0 causes the output power to be zero and the trajectory being followed being defined by Ipeak value 'low', while 'low' is then the peak value of the magnetizing current. So, then the magnetizing current can be further reduced by subtracting an additional term 'Imagn_red'. The result will be that the converter still makes zero load, but with a higher switching frequency.

For a resonant tank with a separate resonant inductor, the attracting forces of the core halves occur both due to magnetizing current and resonant current because, in this case, the separate inductor stores also energy due to the output current slowing, while the resonant transformer does not store energy in this case. So, therefore, a soft start and soft stop can also be applied by modulating ctrl_p for circuits that include a separate inductor.

Figure 28:
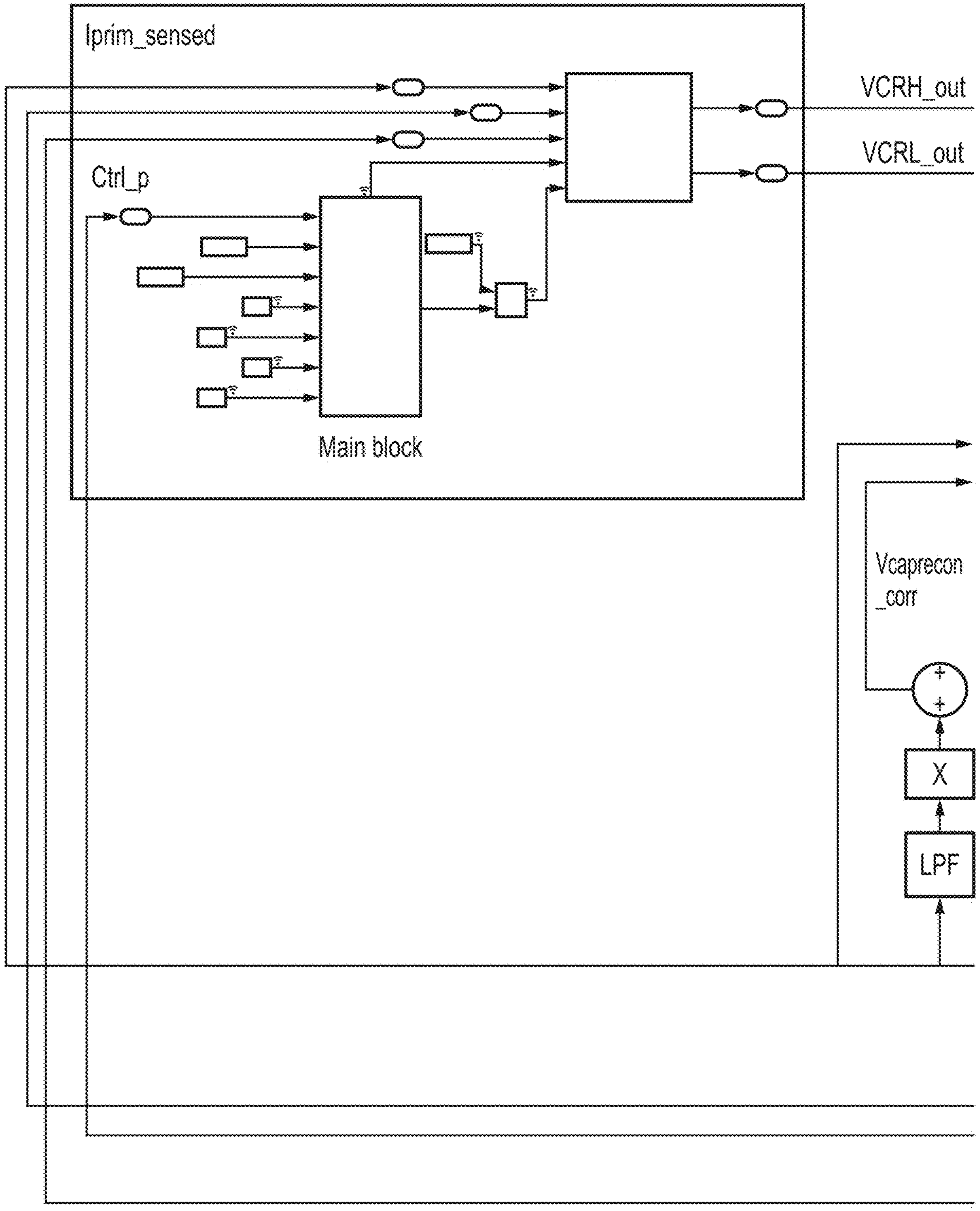
FIG. 28 illustrates an embodiment of a controller for a resonant converter according to the present invention.
Figure 28:
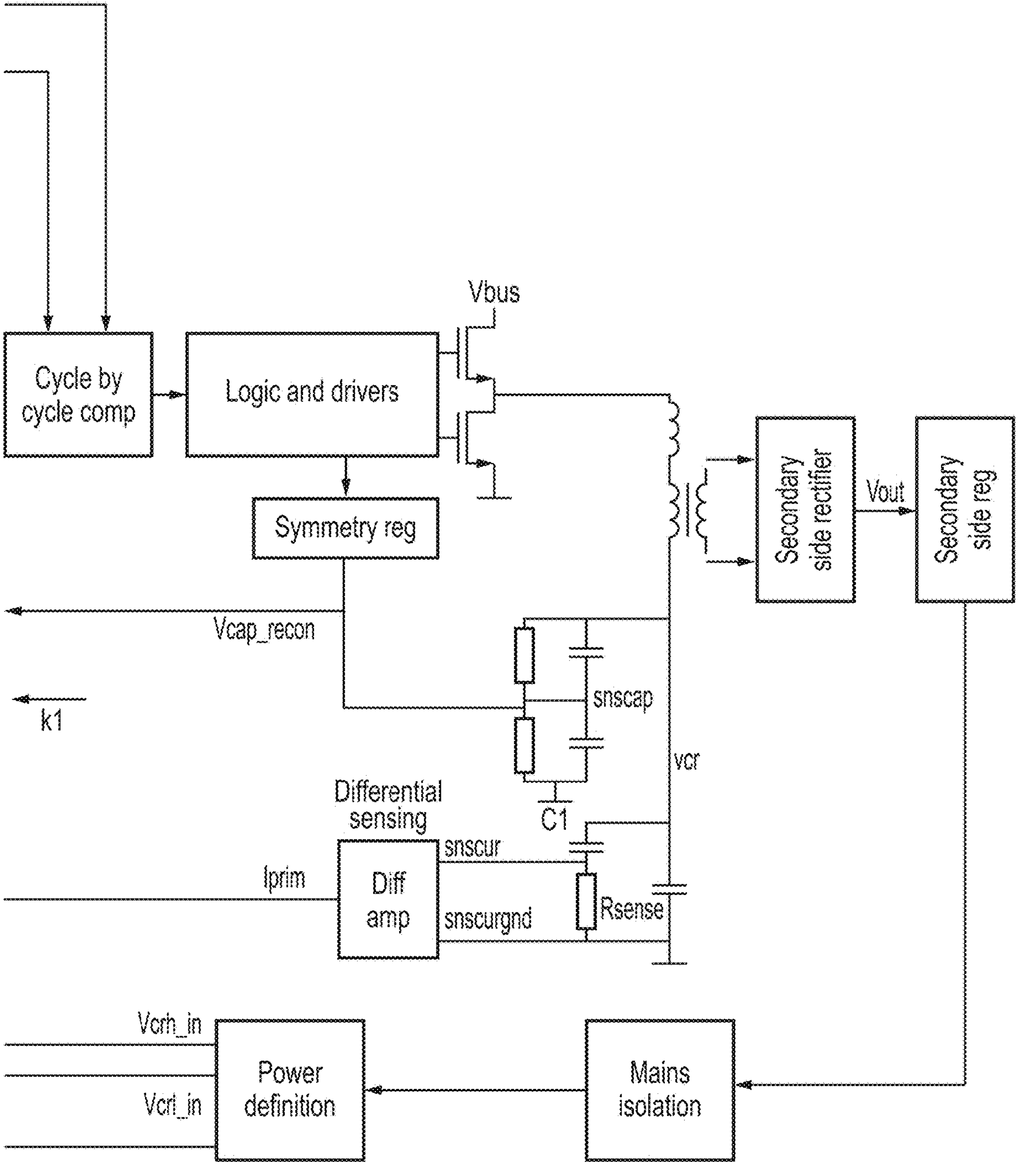

FIG. 28 illustrates an embodiment of a controller for a resonant converter according to the present invention.

Figure 29:
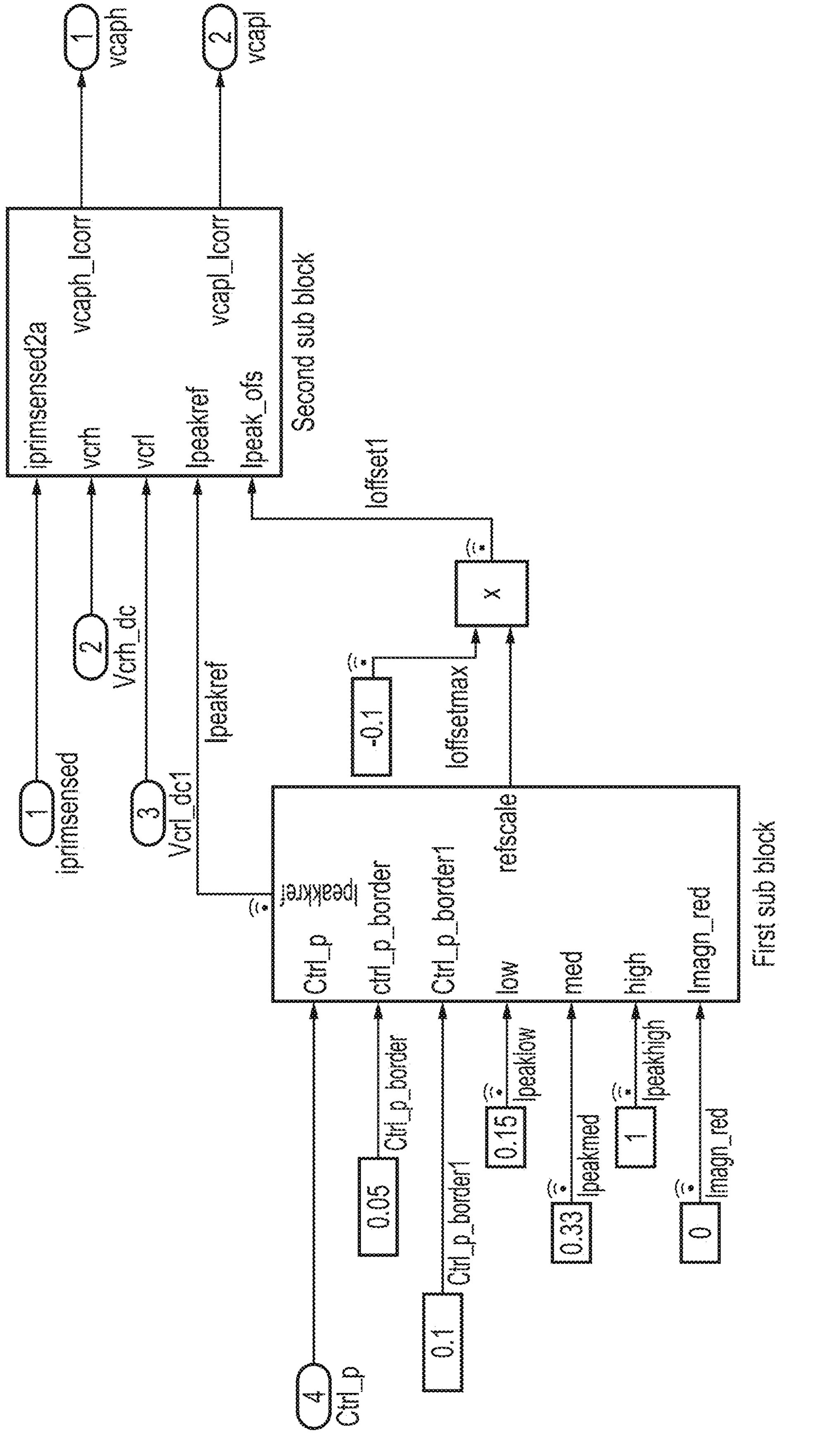
FIG. 29 shows the Simulink implementation of both blocks of FIG. 28.
Figure 30:
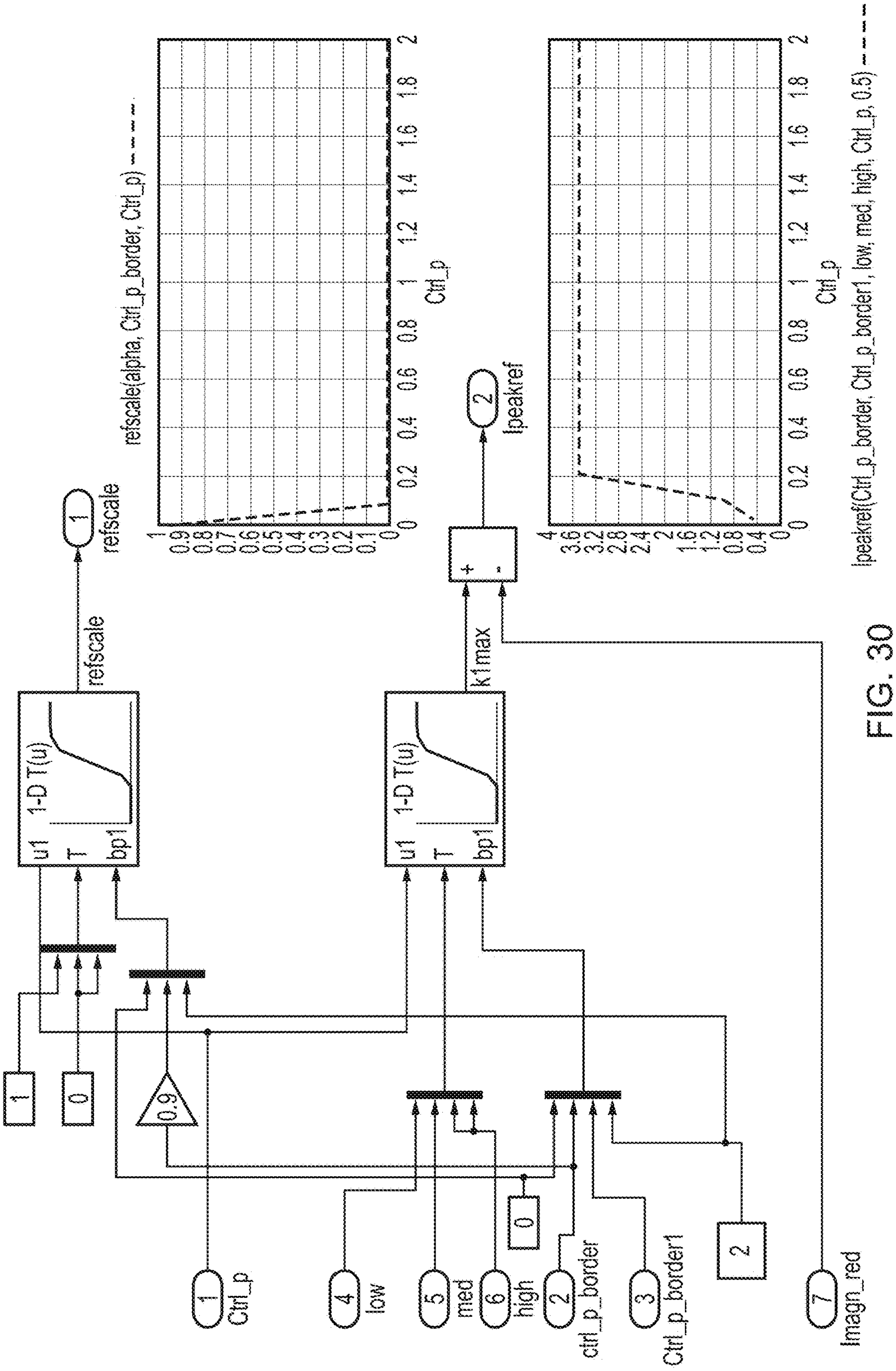
FIG. 30 includes more details of the first sub block.

The embodiment includes a resonant power converter using capacitor voltage control including:

- cycle by cycle comparators
- logic and drivers
- symmetry loop
- capacitive divider for dividing the high voltage signal across the resonant capacitor (vcr) to a low voltage signal (Vcap_recon) as input for the symmetry regulator and cycle by cycle comparators
- an optional delay correction block adding k1 times the sensed resonant current (Iprim) to the Vcap_recon signal in order to define the delay corrected version Vcap_recon_corr
- a current sensing block sensing the current in the resonant capacitor via a capacitive current divider (C1, Rsense), and a differential amplifier to make a noise-free version of the voltage across the sense resistor (Iprim)
- a secondary rectifier stage including rectifier, output filter and output capacitor where the output voltage Vout comes out
- a secondary side regulator generating an error signal based on the output voltage and the desired output voltage.
- a mains isolation between the secondary side of the error signal and the primary side of the error signal
- a power definition block generating
  - the internal main control variable (Ctrl_p)
  - the 2 signals Vorh_in and Vcrl_in being the unadapted input signal for the cycle by cycle comparators.
- The main block representing the core of the present disclosure The main block is described in more detail in FIGS. 28 to 30 based on an implementation in a Simulink model. The same functionality is also modelled in Mathcad, as described in more detail in FIGS. 32-35.

FIG. 29 shows the Simulink implementation of both blocks used to define the Vcrh_out and Vcrl_out signals as function of:

- The sensed resonant tank current (Iprim_sensed2a)
- Signals related to the required output power (Vcrh, Vcrl, Ctrl_p)
- Settings for proper operation of the method for going to no load (Ctrl_p_border, Ctrl_p_border1, low,med,high, Imagn_red, alpha) (alpha is set internally in the first sub block, Iofs_max=scaling factor between refscale and Ipeak_ofs)

FIG. 30 includes more details of the first sub block.

The output 'refscale' generates the signal at the upper graph based on a lookup table with the predefined point (Ctrl_p, refscale) where points of the lookup table are defined using a mux structure (the vertical thick lines with the arrows) and a table definition block with inputs:

- u1 (the continuous variable input Ctrl_p)
- bp1 (the horizontal axis coordinate of the lookup table point)
- T ((the vertical axis coordinate of the lookup table point))

With respect to the refscale signal we have 3 points for the lookup table (see also FIG. 26) for refscale=F (Ctrl_p)

1. (Ctrl_p=0, refscale=1):
2. (Ctrl_p=Ctrl_p_border, refscale=0)
3. Ctrl_p=2, refscale=0)
1. For the Ipeakref output there are 4 lookup points defined (see also FIG. 16) in a similar way using 4 input mux:
2. (Ctrl_p=0, Ipeakref=low):
3. (Ctrl_p=Ctrl_p_border, Ipeakref=med)
4. (Ctrl_p=Ctrl_p_border1, Ipeakref=high)
5. Ctrl_p=2, Ipeakref=high)

The signal 'Imagn_red' is a separate input to allow further reduction of the magnetizing current at zero load conditions as explained in relation to FIG. 27.

Figure 31:
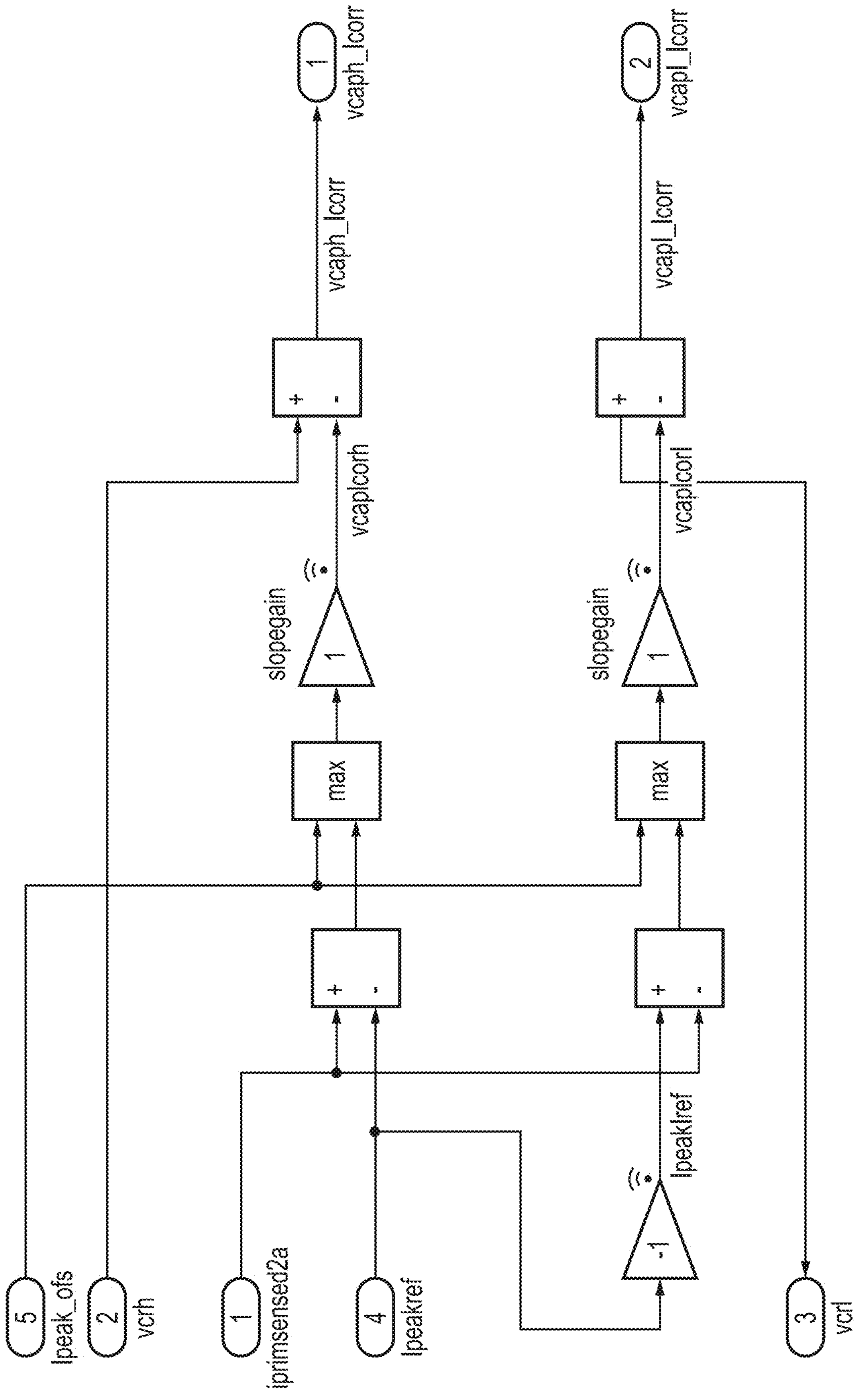
FIG. 31 includes more details of the second sub block.

FIG. 31 includes more details of the second sub block. The two output signals Vcaph_Icorr and Vcapl_Icorr are the result of 2 max functions where the output is the maximum of both inputs and a linear addition.

The following functions are realized in this block:

1. Vcaph_Icorr=F (Ipeak_ofs, vcrh, iprimsensed2a, Ipeakref) as follows:

$$\text{Vcaph\_Icorr} = \quad a$$
$$vcrh - \max(\text{Ipeak\_ofs}, (-iprimsensed2a - Ipeakref) * slopegain).$$

2. Vcapl_Icorr=F (Ipeak_ofs, vcrl, iprimsensed2a, Ipeakref)

$$\text{Vcapl\_Icorr} = \quad a$$
$$vcrl - \max(\text{Ipeak\_ofs}, (iprimsensed2a - Ipeakref) * slopegain).$$

FIGS. 32-35 show the Mathcad implementation of both blocks.

FIG. 32 shows the lookup table structure to generate the Ipeakref signal based on 2 4d vectors and the Iinterp command and resulting graph.

Figure 33:
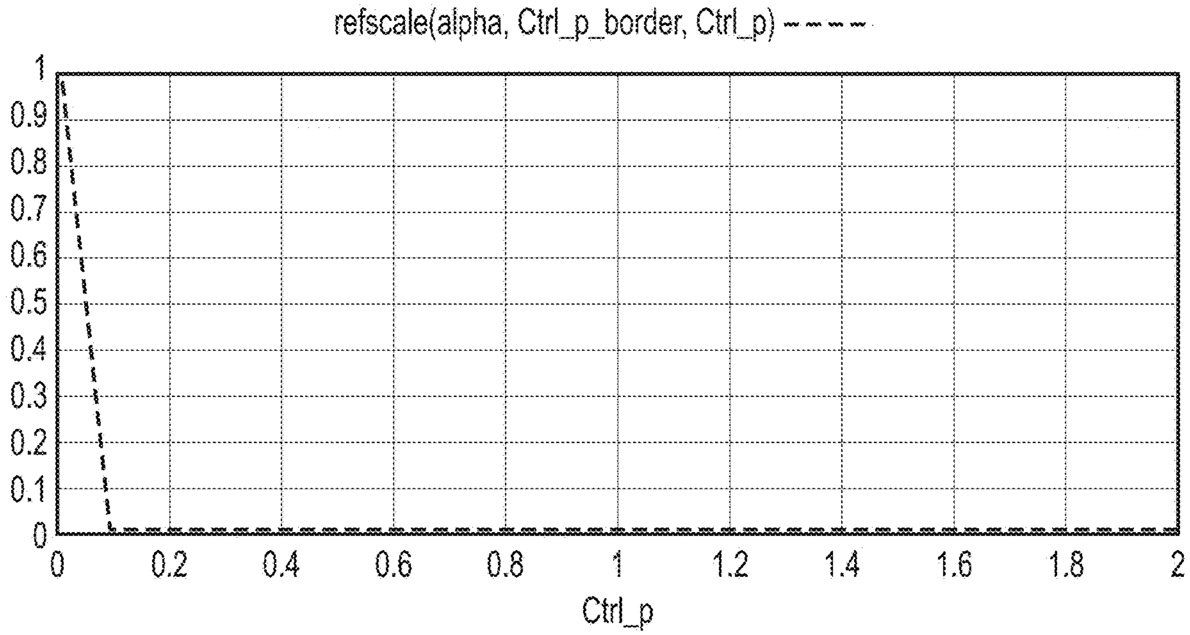
FIG. 33 shows the lookup table structure to generate the refscale function in Mathcad and the resulting graph.

FIG. 33 shows the lookup table structure to generate the refscale function in Mathcad and the resulting graph.

Figure 34:
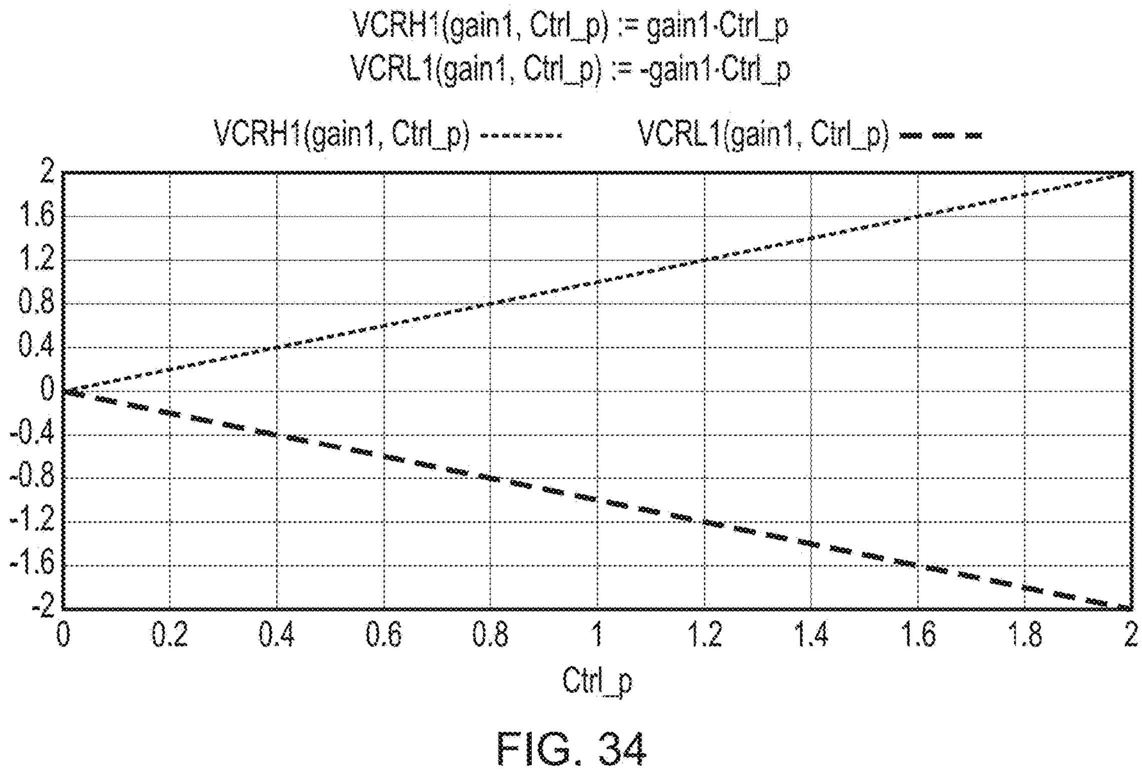
FIG. 34 shows the definition of the VCRH and VCRL signal as function of ctrl_p.

FIG. 34 shows the definition of the VCRH and VCRL signal as function of ctrl_p. This the power definition block of FIG. 27 that delivers the input signals for the main block.

Figure 35:
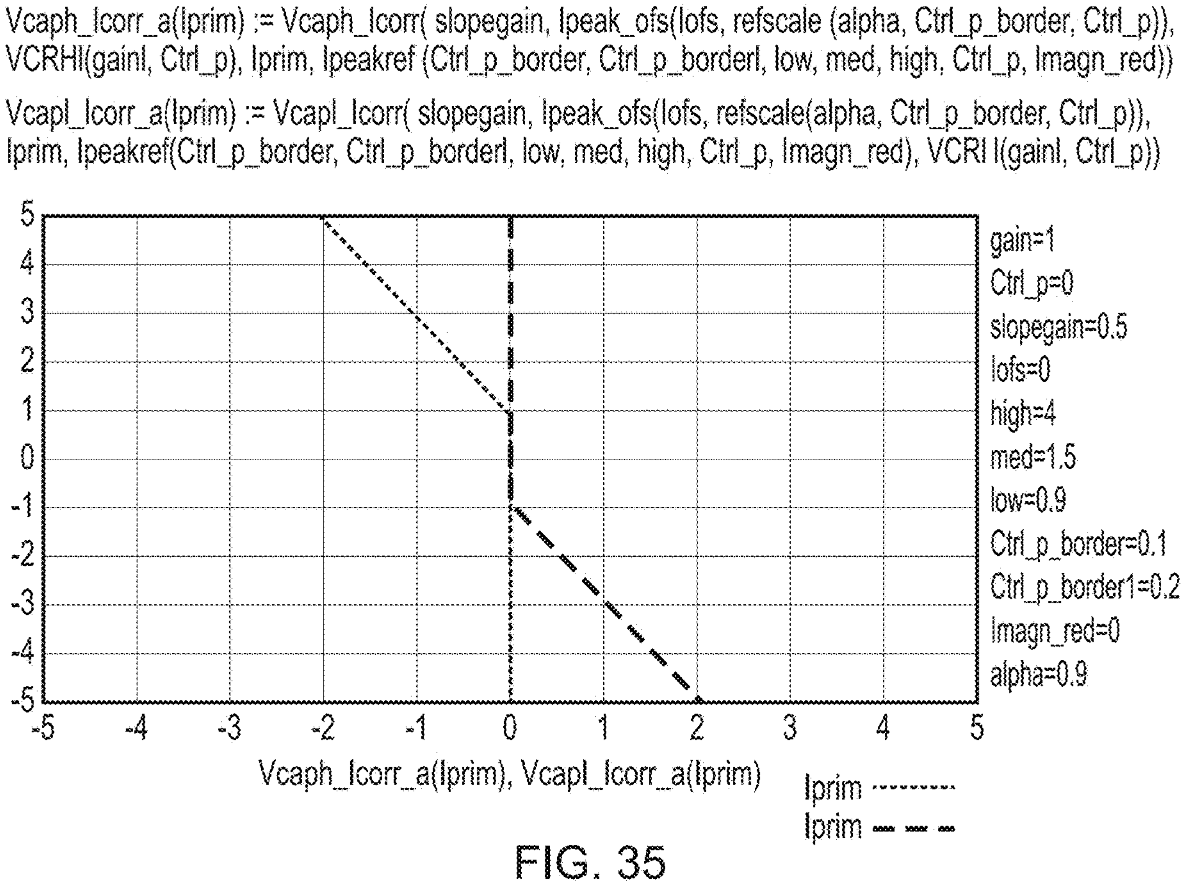
FIG. 35 shows the calculation and plot result in Mathcad of the overall main function block.

FIG. 35 shows the calculation and plot result in Mathcad of the overall main function block from sensed primary current (vertical axis) to Vcrh_out and Vcrl_out signals (horizontal axis). The reason to plot the input signal on the vertical axis and the output signal on the horizontal axis is because it is part of the state plane representation, where resonant current is plotted vertically and resonant capacitor voltage is plotted horizontally.

The function Vcaph_Icorr (Iprim) is a redefinition of the full function Vcaph_Icorr=f (all related variables and sub functions). (See all related variables at the right side of FIG. 35.)

This is done for practical reasons of plotting in Mathcad in order to prevent that the text at the horizontal axis does not fit at the desired width of the plot, that would make the plot unnecessarily wide and less clear to the reader what is being shown.

In the embodiment, the soft start, soft stop function is included according to the features described in relation to 'Definition of the amount of magnetizing reduction during a soft start and soft stop part of a burst-on interval', above. See also FIG. 27.

Examples Described Herein can be Applied in a High Power Mode or a Low Power Mode in Order to Define the Power in the Lower Region Down to Zero Power For low load and no load, a dedicated low power mode can be used.

In a low power mode (LP mode), a full switching cycle can be split up in a part called 'energy conversion cycle' (EC cycle) where the power is delivered to the load and being the same as the normal high power mode (HP mode) switching cycle.

Figure 36:
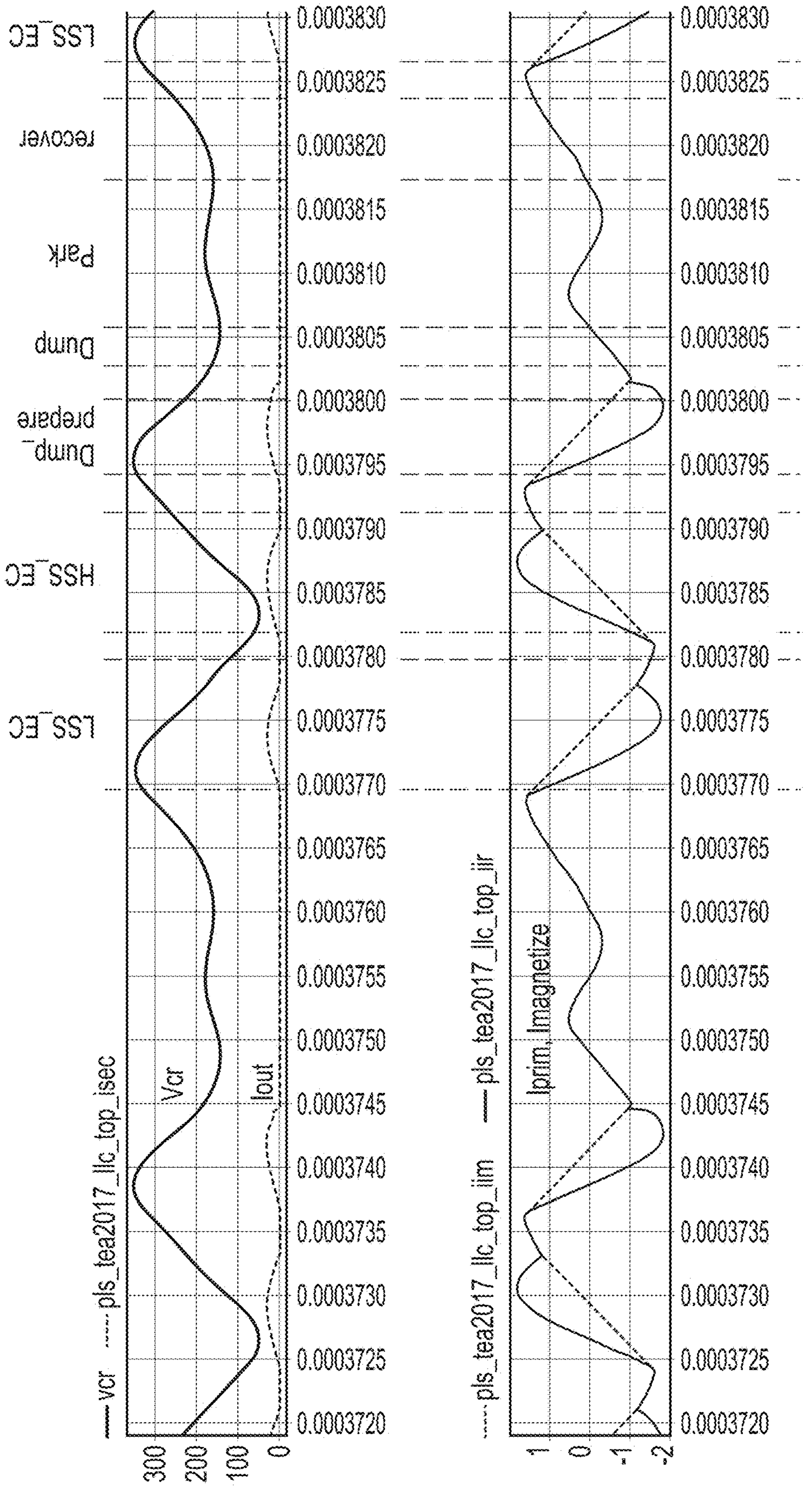
FIG. 36 shows signal during operation in low load.
Figure 36:
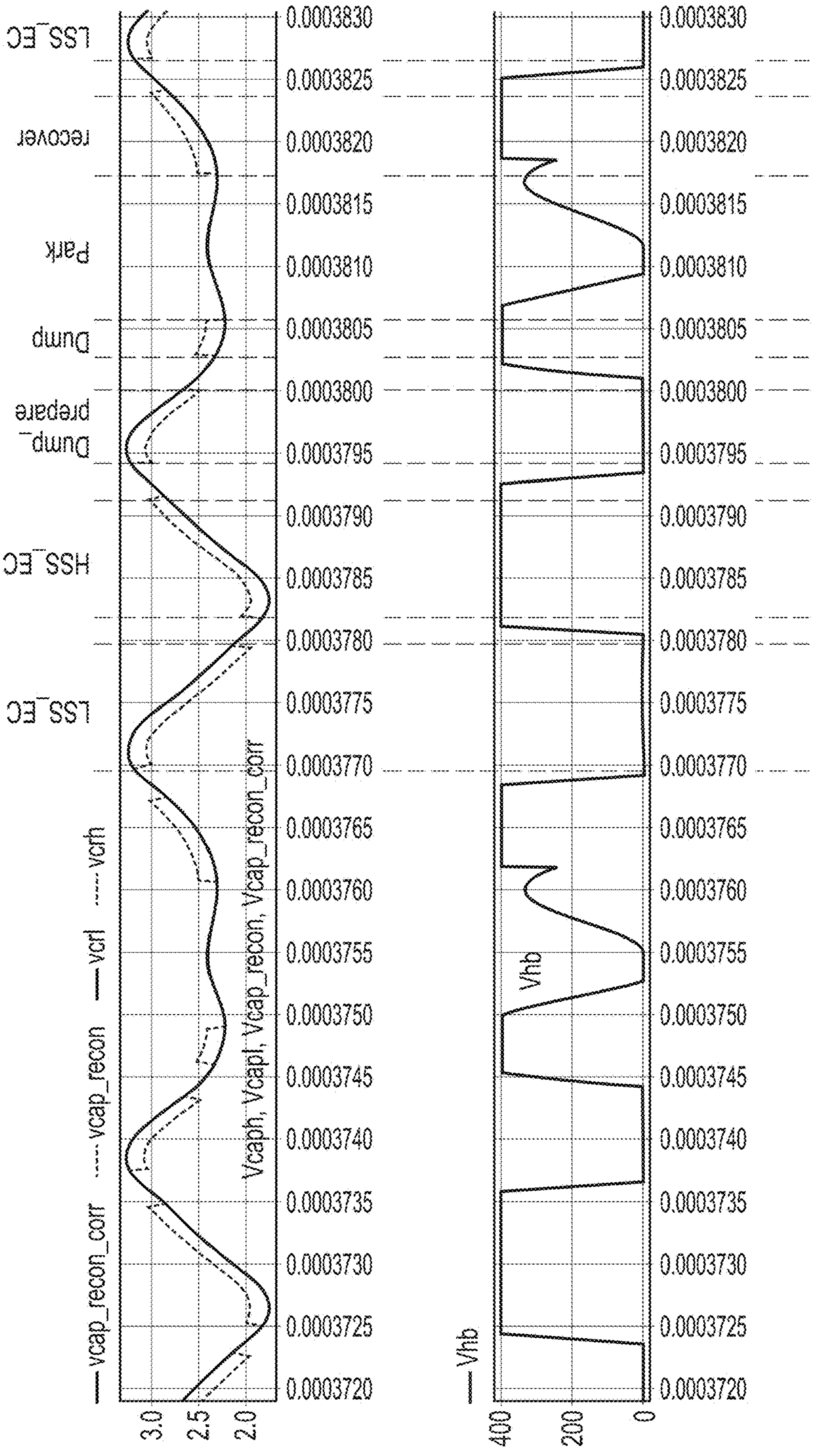

Around 2 EC cycles (or optionally more than 2) intervals can be added to be able to put the converter in a state of rest such that no losses occur. In FIG. 36, the state of rest is called 'park interval'. In the park interval, the resonant current is 0 and the resonant tank in disconnected from the half bridge node as both switches are off. The states 'dump prepare' and 'dump' will park the resonant tank in such a state that when after the park interval a 'recover' interval is activated, the resonant tank returns to a symmetrical trajectory that is the same as in high power mode.

Figure 37:
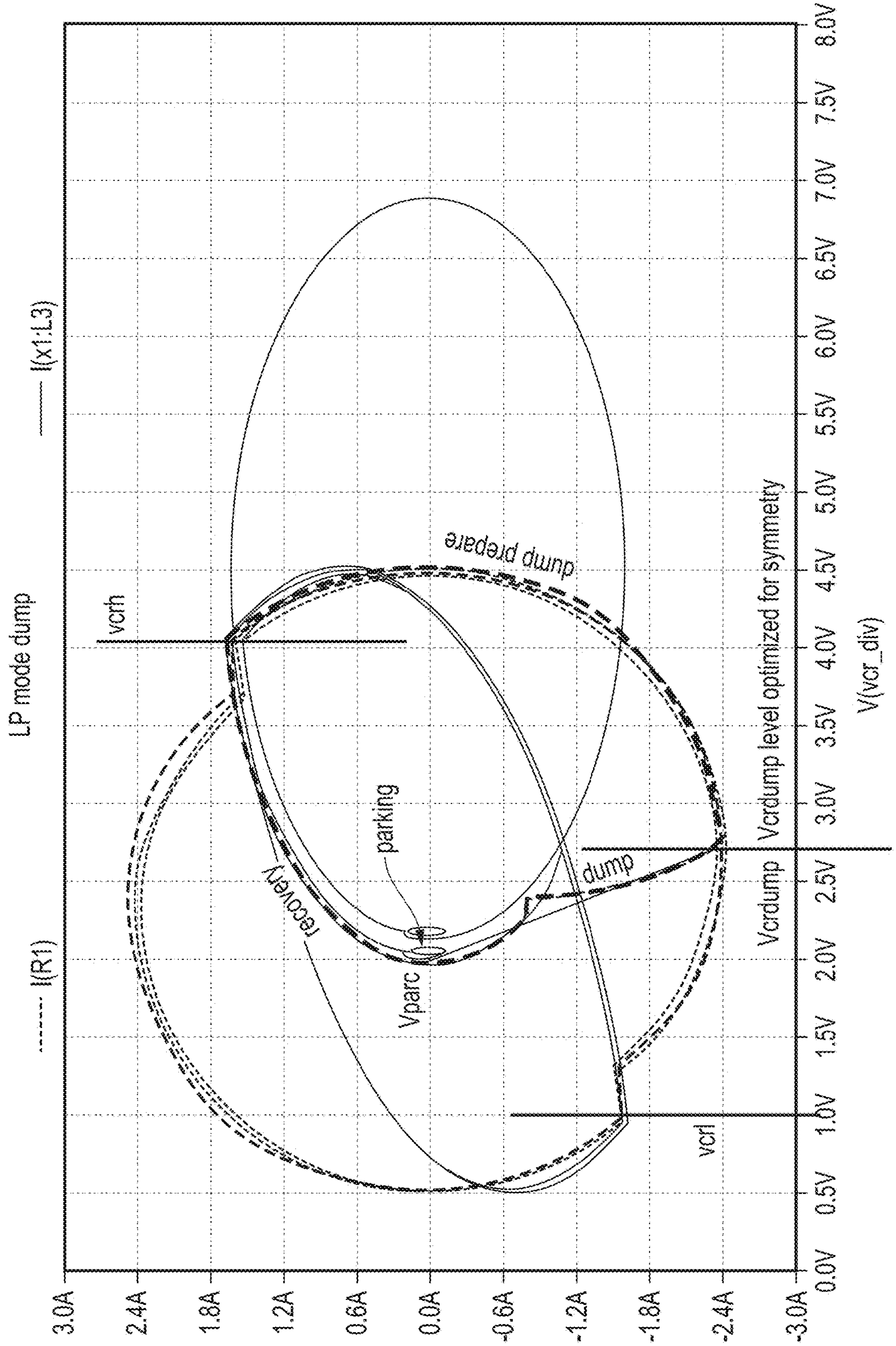
FIG. 37 show low power mode full switching cycle in state plane representation.

As the EC cycle is basically the same as an ECcycle in the normal HP mode, examples described herein can also be applied to the EC cycle of the LP mode. In a LP mode, the recovery state uses the same VCRH level as the VCRH level during the ECcycle. FIG. 37 shows this using the state plane representation.

FIG. 37 show low power mode full switching cycle in state plane representation.

As can be seen from FIG. 37, the vcrh level after the recovery interval is the same as the vcrh level at the end of the HSS half cycle during the EC interval. So with the invention active, the vcrh level is kept the same for both instants.

In order to make both EC half cycles of the LP mode symmetrical, there is only one value for the Vcrdump level that gives this symmetry. Therefore, an additional feature of the present disclosure is to define a function Vcrdump (vcrh, vcrl) to get optimum symmetry (actually this is VCRH_out and VCRL_out in FIG. 28).

In contrast to the known prior art, examples of the present disclosure can provide stable zero load operation while switching for resonant converters with high operating frequency that are controlled by capacitor voltage control method. Such converters are therefore forced to use burst mode or frequency control. Burst mode is made possible for certain applications where, for example, two output voltages are made. With frequency control, it can be directly possible to use dedicated low power modes that allow larger part load efficiency. Therefore, examples disclosed herein can open the way to go to zero-load and efficient part-load operation using dedicated low power modes.

Examples disclosed herein use a slope compensation, but over specific range of resonant current. The slope of the Vcap levels and the point where the slope comes in can be defined in a specific way to force the converter to the zero load situation, or situation with reduced magnetizing current, in such a way that the likelihood of instabilities is reduced, while still being compatible with a certain amount of delay in the capacitor voltage control part.

Examples disclosed herein can replace the slope by a fixed Vcap level in a specific way to force the resonant tank to follow to a stable low load or zero load trajectory or trajectory with reduced magnetizing currents as needed for soft start and soft stop.

Examples disclosed herein find application in high frequency resonant converters and lower frequency resonant converters where better definition of soft start and soft stop during burst mode is required in order to further reduce audible noise.

Examples disclosed herein relate to a method of allowing no load operation of a high frequency resonant converter where internal delays could otherwise prevent the possibility to go to no-load while switching.

Features of the present disclosure include:

1. A resonant converter controller including the capacitor voltage control method for defining the power
2. Feature 1 including a method for defining the effective vcap levels in a stable way such that
   - no load operation is possible while switching and
   - further reduction of the magnetizing current is possible to make soft start and soft stop functionality
3. The method of step 2 having one or more of the following features:
   - A slope compensation signal added to the Vcap levels derived from the primary current (creating a vcap level Vcap0+a×Iresonant) in order to force the switching cycle to follow the desired convergence to a desired stable trajectory (FIGS. 6 and 7)
   - Applying the slope only during a well defined part of the Vcr window in order to prevent multiple trajectories (define convergence to only 1 frequency) (FIG. 8)
   - Reducing Vcap0 such that it remains positive outside the region where the slope is in order to force the trajectory to the desired and stable magnetizing current (FIGS. 9-14 and FIGS. 23-25).
   - Definition of the Ipeak current by a predefined curve as a function of the main power control variable. (FIGS. 16-22 and 26)
4. Method 3 being applied in a high power mode or a low power mode in order to define the power in the lower region down to zero power.
   - In a LP mode, the recovery state uses the same VCRH level as the VCRH level during the ECcycle (FIGS. 36-37)
   - Define a function Vcrdump (vcrh, vcrl) to get optimum symmetry (FIGS. 36-37)
5. Method 3 applied in order to define the amount of magnetizing reduction during the soft start and soft stop part of the burst on interval (FIG. 27)
6. Method 3 applied in order to define the converted power during the soft start and soft stop part of the burst on interval (FIG. 27)

Figure 38:
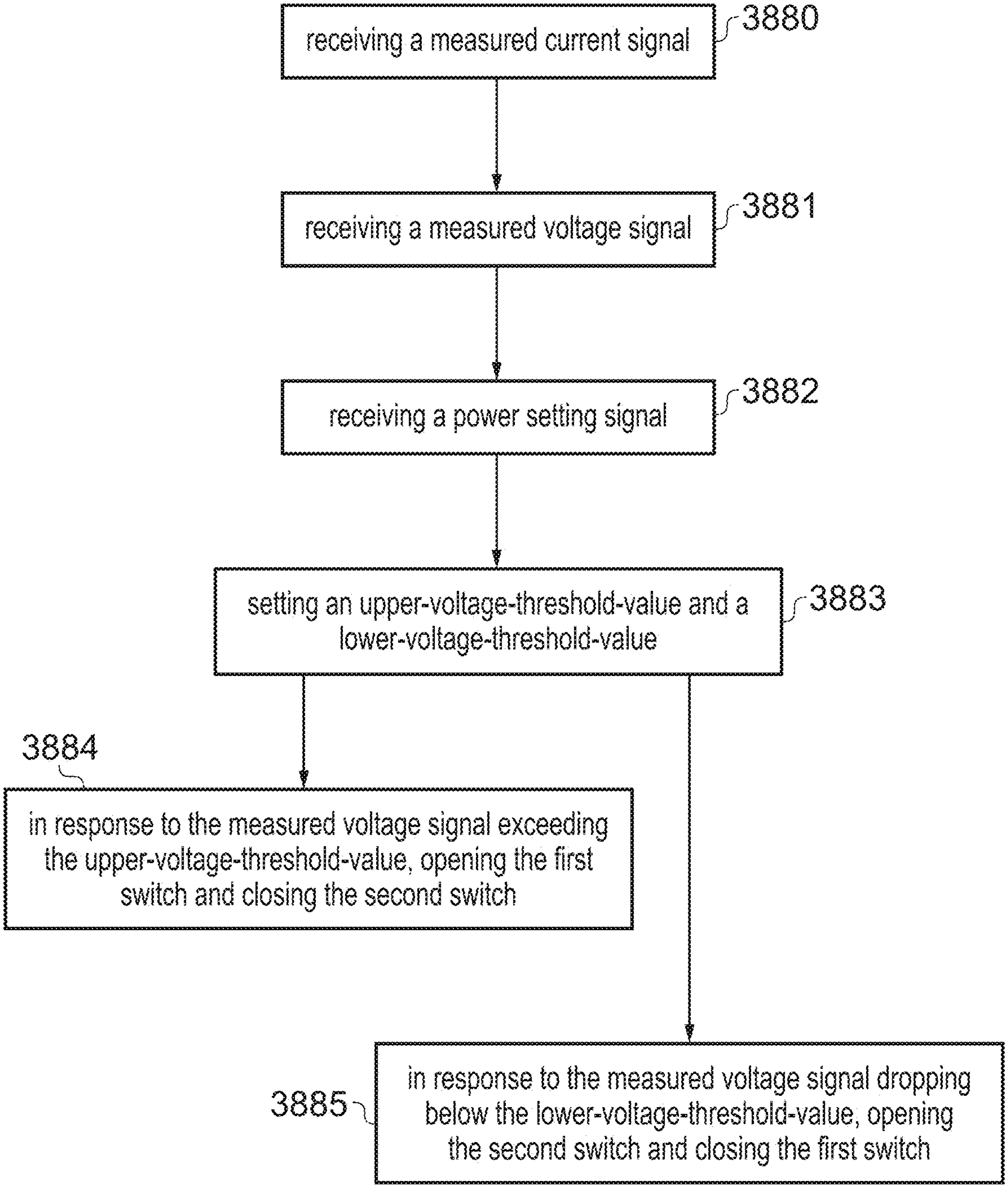
FIG. 38 shows an example embodiment of a method of operating a resonant converter according to the present disclosure.

FIG. 38 shows an example embodiment of a method of operating a resonant converter according to the present disclosure. The resonant converter can be any of the resonant converters disclosed herein.

The method comprises:

at step 3880, receiving a measured current signal that represents the current flowing in the resonant tank;

at step 3881, receiving a measured voltage signal that represents the voltage at a predetermined point in the resonant tank; and at step 3882, receiving a power setting signal, which defines a requested power level for the load.

At step 3883, the method includes:

if the measured current signal is greater than an upper-low-load-current-threshold, then setting an upper-voltage-threshold-value based on the measured current signal;

if the measured current signal is not greater than the upper-low-load-current-threshold, then setting the upper-voltage-threshold-value based on the power setting signal but independent of the measured current signal;

if the measured current signal is less than a lower-low-load-current-threshold, then setting a lower-voltage-threshold-value based on the measured current signal; and if the measured current signal is not less than the lower-low-load-current-threshold, then setting the lower-voltage-threshold-value based on the power setting signal but independent of the measured current signal.

At step 3884, in response to the measured voltage signal exceeding the upper-voltage-threshold-value, the method includes opening the first switch and closing the second switch.

At step 3885, in response to the measured voltage signal dropping below the lower-voltage-threshold-value, the method includes opening the second switch and closing the first switch.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A controller for a resonant converter, wherein the resonant converter is for supplying electrical energy from a supply source to a load, the resonant converter comprising:

a first switch and a second switch connected in series with each other between the supply source and a reference terminal, wherein the resonant converter has a high-side switch half cycle when the first switch is closed and the second switch is open, and wherein the resonant converter has a low-side switch half cycle when the first switch is open and the second switch is closed; and a resonant tank that is electrically connected to the first and second switches, wherein the resonant tank comprises a resonant capacitor;

wherein the controller is configured to:

receive a measured current signal that represents a current flowing in the resonant tank;

receive a measured voltage signal that represents a voltage at a predetermined point in the resonant tank;

receive a power setting signal, which defines a requested power level for the load;

if the measured current signal is greater than an upper-low-load-current-threshold, then set an upper-voltage-threshold-value based on the measured current signal;

if the measured current signal is not greater than the upper-low-load-current-threshold, then set the upper-voltage-threshold-value based on the power setting signal but independent of the measured current signal;

if the measured current signal is less than a lower-low-load-current-threshold, then set a lower-voltage-threshold-value based on the measured current signal;

if the measured current signal is not less than the lower-low-load-current-threshold, then set the lower-voltage-threshold-value based on the power setting signal but independent of the measured current signal;

in response to the measured voltage signal exceeding the upper-voltage-threshold-value, open the first switch and close the second switch; and in response to the measured voltage signal dropping below the lower-voltage-threshold-value, open the second switch and close the first switch.

2. The controller of claim 1, wherein the controller is further configured to:

set a value of the upper-low-load-current-threshold based on the received power setting signal; and set a value of the lower-low-load-current-threshold based on the received power setting signal.

3. The controller of claim 2, wherein the controller is further configured to, if the received power setting signal is greater than a high-load threshold, then:

set the value of the upper-low-load-current-threshold as a high-load constant value; and set the value of the lower-low-load-current-threshold as a low-load constant value.

4. The controller of claim 3, wherein the controller is further configured to, if the received power setting signal is less than the high-load threshold, then:

set the value of the upper-low-load-current-threshold as a value that is less than the high-load constant value; and set the value of the lower-low-load-current-threshold as a value that is less than the low-load constant value.

5. The controller of claim 3, wherein the controller is further configured to, if the received power setting signal is less than the high-load threshold, then:

set the value of the upper-low-load-current-threshold as a function of the received power setting signal; and set the value of the lower-low-load-current-threshold as the function of the received power setting signal.

6. The controller of claim 5, wherein the controller is configured to:

set the value of the upper-low-load-current-threshold as a zero-load-current-value if the received power setting signal is zero; and set the value of the lower-low-load-current-threshold as the zero-load-current-value if the received power setting signal is zero.

7. The controller of claim 5, wherein the controller is further configured to, if the received power setting signal is less than the high-load threshold, then:

set the value of the upper-low-load-current-threshold as:

a first function of the received power setting signal if the received power setting signal is greater than a medium-load threshold; and a second function of the received power setting signal if the received power setting signal is less than the medium-load threshold; and set the value of the lower-low-load-current-threshold as:

the first function of the received power setting signal if the received power setting signal is greater than the medium-load threshold; and the second function of the received power setting signal if the received power setting signal is less than the medium-load threshold.

8. The controller of claim 7, wherein the first function and the second function are linear functions, and wherein the first function is steeper than the second function.

9. The controller of claim 1, wherein the controller is further configured to, if the power setting signal is less than an offset-current-application-power-threshold:

adjust the measured current signal by adding an offset current signal to the measured current signal, and use the adjusted measured current signal instead of the measured current signal.

10. The controller of claim 9, wherein a magnitude of the offset current signal increases as a magnitude of the power setting signal reduces.

11. The controller of claim 10, wherein the magnitude of the offset current signal linearly increases as the magnitude of the power setting signal reduces.

12. The controller of any one of claim 9, wherein a magnitude of offset current signal has a maximum value when a magnitude of the power setting signal is zero.

13. A method of operating a resonant converter, wherein the resonant converter is for supplying electrical energy from a supply source to a load, the resonant converter comprising:

a first switch and a second switch connected in series with each other between the supply source and a reference terminal, wherein the resonant converter has a high-side switch half cycle when the first switch is closed and the second switch is open, and wherein the resonant converter has a low-side switch half cycle when the first switch is open and the second switch is closed; and a resonant tank that is electrically connected to the first and second switches, wherein the resonant tank comprises a resonant capacitor;

wherein the method comprises:

receiving a measured current signal that represents a current flowing in the resonant tank;

receiving a measured voltage signal that represents a voltage at a predetermined point in the resonant tank;

receiving a power setting signal, which defines a requested power level for the load;

if the measured current signal is greater than an upper-low-load-current-threshold, then setting an upper-voltage-threshold-value based on the measured current signal;

if the measured current signal is not greater than the upper-low-load-current-threshold, then setting the upper-voltage-threshold-value based on the power setting signal but independent of the measured current signal;

if the measured current signal is less than a lower-low-load-current-threshold, then setting a lower-voltage-threshold-value based on the measured current signal;

if the measured current signal is not less than the lower-low-load-current-threshold, then setting the lower-voltage-threshold-value based on the power setting signal but independent of the measured current signal;

in response to the measured voltage signal exceeding the upper-voltage-threshold-value, opening the first switch and closing the second switch; and in response to the measured voltage signal dropping below the lower-voltage-threshold-value, opening the second switch and closing the first switch.

* * * * *